(12) United States Patent
Monastyrov

(10) Patent No.: US 12,485,483 B2
(45) Date of Patent: Dec. 2, 2025

(54) METAL PARTICLES AND METHOD FOR PREPARATION THEREOF USING ELECTROEROSION DISPERSION

(71) Applicant: Mykola Monastyrov, Kiev (UA)

(72) Inventor: Mykola Monastyrov, Kiev (UA)

(*) Notice: Subject to any disclaimer, the term of this patent is extended or adjusted under 35 U.S.C. 154(b) by 674 days.

(21) Appl. No.: 17/631,669

(22) PCT Filed: Jul. 31, 2020

(86) PCT No.: PCT/IB2020/000640
§ 371 (c)(1),
(2) Date: Jan. 31, 2022

(87) PCT Pub. No.: WO2021/019303
PCT Pub. Date: Feb. 4, 2021

(65) Prior Publication Data
US 2022/0274171 A1    Sep. 1, 2022

Related U.S. Application Data

(60) Provisional application No. 62/881,031, filed on Jul. 31, 2019.

(51) Int. Cl.
*B22F 9/14* (2006.01)
*B22F 1/052* (2022.01)
(Continued)

(52) U.S. Cl.
CPC .............. *B22F 9/14* (2013.01); *B22F 1/052* (2022.01); *C01F 7/027* (2013.01); *C01F 7/424* (2013.01);
(Continued)

(58) Field of Classification Search
CPC ............... B22F 9/14; B22F 2003/1051; B22F 2003/1054
See application file for complete search history.

(56) References Cited

U.S. PATENT DOCUMENTS 5,662,922 A    9/1997   Christensen
2005/0150759 A1  7/2005   Chang
(Continued)

FOREIGN PATENT DOCUMENTS

CN    1559662 A    1/2005
CN    1933906 A    3/2007
(Continued)

OTHER PUBLICATIONS

Halbedel et al. ("Iron oxide nanopowder synthesized by electroerosion dispersion (EED)—Properties and potential for microwave applications" Current Applied Physics, vol. 18, Nov. 2018) (Year: 2018).*

(Continued)

*Primary Examiner* — Ricardo D Morales
(74) *Attorney, Agent, or Firm* — DLA Piper LLP (US)

(57) ABSTRACT

In one aspect, a method for fabricating metal particles is disclosed, which includes adding a plurality of metallic elements into a plasma reactor comprising a circulating fluid and two electrodes, evaporating the metallic elements to form metal vapor using plasma generated by at least one electric discharge pulse between the electrodes; and condensing the metal vapor to form metal particles. In some embodiments, the metal particles comprise metal oxide particles. In some embodiments, the metal particles are useful as part of pharmaceutical compositions or dietary supplements.

11 Claims, 18 Drawing Sheets

(51) Int. Cl.
  *C01F 7/027* (2022.01)
  *C01F 7/424* (2022.01)
  *C01G 49/02* (2006.01)
(52) U.S. Cl.
  CPC .......... *C01G 49/02* (2013.01); *B22F 2202/13* (2013.01); *B22F 2301/35* (2013.01); *B22F 2302/25* (2013.01); *C01P 2004/62* (2013.01); *C01P 2004/64* (2013.01); *C01P 2006/42* (2013.01)

(56) References Cited

U.S. PATENT DOCUMENTS

| | | | |
|---|---|---|---|
| 2013/0178356 A1 | 7/2013 | Kim et al. | |
| 2014/0255716 A1* | 9/2014 | Faulkner | B22F 1/054 428/570 |

FOREIGN PATENT DOCUMENTS

| | | | |
|---|---|---|---|
| JP | 2022542480 A | 10/2022 | |
| RU | 1816581 C | 5/1993 | |
| RU | 2015114018 A | 11/2016 | |
| RU | 2631549 C1 | 9/2017 | |
| SU | 1060379 A | * 12/1983 | |
| WO | 2011155473 A1 | 12/2011 | |
| WO | 2021019303 A1 | 2/2021 | |

OTHER PUBLICATIONS

SU-1060379-A english translation (Year: 1983).*
Halbedel et al., "Iron Oxide Nanopowder Synthesized by Electroerosion Dispersion (EED)—Properties and Potential for Microwave Applications", Current Applied Physics, Aug. 10, 2018, pp. 1410-1414, vol. 18(11).
Monastyrov et al., "Electroerosion Dispersion-Prepared Nano- and Submicrometre-sized Aluminium and Alumina Powders as Power-Accumulating Substances", Nanotechnology Perceptions, Jul. 30, 2008, vol. 4(2), Abstract.
Chinese Office Action for application No. CN 202080066056.0 dated Oct. 17, 2024.
Japanese Office Action for application No. JP 2022-506651 dated Oct. 1, 2024.
Chinese Office Action for application No. CN 202080066056.0 dated Mar. 11, 2025. (with English Translation).
Japanese Office Action for application No. JP 2022-506651 dated Apr. 1, 2025. (with Machine Translation).
Chinese Office Action for application No. CN 202080066056.0 dated Jun. 27, 2025.

* cited by examiner

|  | Density ρ | Particle sizes | | | |
| --- | --- | --- | --- | --- | --- |
|  |  | Mean value | $D_{10,3}$ | $D_{50,3}$ | $D_{90,3}$ |
|  | [g/cm³] | [μm] | [μm] | [μm] | [μm] |
| Iron oxide EED particles before microwave heating | 5.347 ± 0.015 | 9.1 ± 2.7 | 3.6 ± 0.6 | 6.1 ± 1.6 | 11.8 ± 4.9 |
| Iron oxide EED particles after microwave heating | 5.393 ± 0.036 |  |  |  |  |

FIG. 8

| Sample | | $M_S$ | | $_jH_c$ | $M_r$ |
|---|---|---|---|---|---|
| | | emu/g | kA/m | kA/m | kA/m |
| Iron oxide EED particles before microwave heating | | 95.8 | 301.0 | 5.0 | 10.6 |
| Iron oxide EED particles after microwave heating | | 75.1 | 265.1 | 10.8 | 20.6 |
| $Fe_3O_4$ | bulk | 92 | – | – | – |
| | nanoscale | 84,7 | – | <15,1 | – |
| | superparamagnetic | <68 | – | 0 | 0 |
| Fe | bulk | 221.71 | – | 0.031 | – |
| | nanoscale | 153 | – | 28.65 | – |

FIG. 11

| Metal ions | Concentration, ml/l | |
|---|---|---|
| | Before purification | After purification |
| Al | 16.2 | <0.05 |
| Fe | 55.5 | 0.5 |
| Cr | 234.0 | 0.07 |
| Cu | 149.5 | 0.69 |
| Mo | 8.71 | <0.05 |
| Zn | 25.5 | 0.28 |
| Co | 19.4 | 0.08 |
| Ni | 25.7 | 0.05 |
| Cd | 78.0 | 0.43 |
| Mn | 1.9436 | 0.0006 |
| As | 49.2 | 0.01 |
| Sn | 6.9 | 0.09 |
| Pb | 3.3 | <0.1 |

FIG. 15

| Metal | Allowable concentration, mg/dm³ | 1st test | | | 2nd test | | |
|---|---|---|---|---|---|---|---|
| | | Concentration of metal, mg/dm³ | | Purification, % | Concentration of metal, mg/dm³ | | Purification, % |
| | | Before purification | After purification | | Before purification | After purification | |
| Copper | 0.002 | 149.5 | 0.69 | 99.5 | 42.5 | 0.05 | 99.9 |
| Chromium$^{+6}$ | 0.03 | 234 | 0.07 | 100 | 100 | < 0.01 | 100 |
| Aluminum | 0.02 | 16.2 | < 0.05 | 99.7 | 13.0 | < 0.05 | 99.2 |
| Cadmium | N.A. | 78 | 0.43 | 99.4 | 1.8 | < 0.01 | 99.4 |
| Iron (total) | 0.5 | 55.5 | 0.50 | 99.1 | 2.4 | 0.005 | 99.8 |
| Nickel | 0.04 | 25.7 | 0.18 | 99.3 | 56 | 0.05 | 99.9 |
| Lead | 0.5 | 3.3 | < 0.2 | 94.0 | 0.45 | < 0.03 | 93.3 |
| Tin | – | 0.9 | 0.09 | 98.7 | 4.4 | < 0.05 | 99.0 |
| Zinc | 0.02 | 25.5 | 0.28 | 98.9 | 17.2 | <0.005 | 100 |
| TOTAL | | 594.6 | 2.49 | 99.6 | 317.75 | 0.26 | 99.9 |

FIG. 16

METAL PARTICLES AND METHOD FOR PREPARATION THEREOF USING ELECTROEROSION DISPERSION

CROSS-REFERENCE TO RELATED APPLICATIONS

This application is a U.S. National Stage filing under 35 U.S.C. § 371 of PCT Application No. PCT/IB2020/000640 filed Jul. 31, 2020, which claims priority to U.S. Provisional Application Ser. No. 62/881,031 filed on Jul. 31, 2019, the content of which are hereby incorporated by reference in their entirety.

BACKGROUND

Submicron and nanometer-sized particles have attracted considerable interest in many applications due to not only their biological and chemical compatibilities but also to their unique properties such as their strong absorption, scattering, and magnetic moment. The composition, structure, and size of submicron and nanometer-sized particles are important characteristics influencing their properties. The way submicron and nanometer-sized particles are prepared determines their composition, structure, and size and is therefore a key issue for technological applications.

Top-down and bottom-up approaches are generally used to prepare submicron and nanometer-sized particles. The top-down approach involves taking bulk materials as starting materials and reducing the size of the materials by fragmentation. This is typically done by crushing and grinding. This approach has for advantage its universality, simplicity, and low cost. However, this approach usually results in polydispersed particles with impurities, defects, and a minimum size of about 0.8 µm. On the other hand, the bottom-up approach involves creating objects from small building blocks that are capable of spontaneously assembling into useful structures. This approach can result in smaller structures that are easier to tailor. However, submicron and nanometer-sized particles prepared by this approach often involves complex and costly procedures that can be challenging to reproduce and scale-up.

Accordingly, there is a need for better methods to prepare submicron and nanometer-sized particles.

SUMMARY

In some embodiments, a method of fabricating metal particles is disclosed. In these embodiments, the method can comprise: adding a plurality of metallic elements into a plasma reactor comprising a circulating fluid and two electrodes; evaporating the metallic elements to form metal vapor using plasma generated by at least one electric discharge pulse between the electrodes; and condensing the metal vapor to form metal particles. In some embodiments, the method can further comprise: transporting the metallic particles to a sedimentation tank coupled to the plasma reactor; allowing the metallic particles to settle into the sedimentation tank; removing the sediment from the sedimentation tank; sublimating the sediment; drying the sediment; and milling the sediment.

In these embodiments and other embodiments, the metallic particles can be transported to the sedimentation tank by the circulating fluid.

In some embodiments, the metallic elements can be selected from the group consisting of iron containing elements, aluminum containing elements, titanium containing elements, and tungsten containing elements, or any combinations thereof.

In some embodiments, the circulating fluid can comprise water, hydrogen peroxide, or a combination thereof.

In some embodiments, the metal particles can have a size between 2 nm and 60 µm, or between 2 nm and 30 µm, or between 2 nm and 1 µm In some embodiments, the metal particles can comprise metal oxide particles.

In some embodiments, the metal particles can comprise iron oxide particles. In these embodiments, the iron oxide particles can absorb microwaves.

In some embodiments, the metal particles comprise alumina particles.

In some embodiments, a method of extracting ions of metals from liquid samples using the metal particles mentioned above is disclosed. In these embodiments, the method can comprise: mixings the metal particles with the liquid sample; reacting the metal particles with the ions; coagulating the reacted metal particles to form a slurry; and filtrating the slurry.

In some embodiments, the filtration of the slurry is done with a filter with a mesh size between 0.1 µm and 25 µm.

In some embodiments, the degree of extraction of ions from the liquid sample is between 80% and 100%.

In some embodiments, the metal particle is part of a pharmaceutical composition for oral or intravenous administration or a dietary supplement which can include but is not limited to beverages.

BRIEF DESCRIPTION OF THE DRAWINGS

The present disclosure is described with reference to the following figures, which are presented for the purpose of illustration only and are not intended to be limiting.

In the drawings:

FIG. 8 is a table presenting the density and particle sizes of iron oxide EED particles in accordance with aspects of the present disclosure;

FIG. 11 is a table presenting the magnetic values of iron oxide EED particles, $Fe_3O_4$ (comparative example), and Fe (comparative example) at room temperature in accordance with aspects of the present disclosure;

FIG. 15 is a table presenting the results from the extraction of heavy metal ions from a liquid sample of a galvanic drain using iron oxide EED particles in accordance with aspects of the present disclosure;

FIG. 16 is a table presenting the results from the purification of contaminated water from electroplating production using amorphous aluminum oxide EED particles in accordance with aspects of the present disclosure;

DETAILED DESCRIPTION

Figure 1:
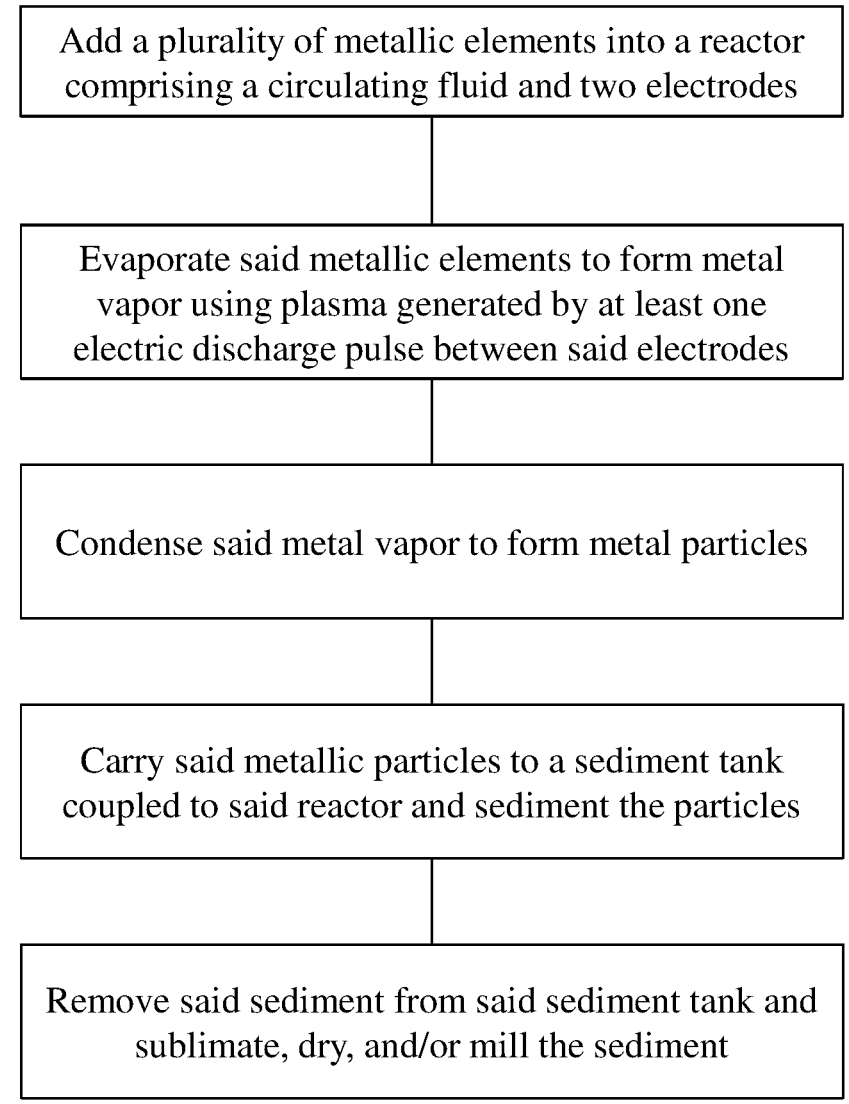
FIG. 1 is a flow chart depicting various steps in an exemplary embodiment for the preparation of metal particles using an electroerosion dispersion (EED) system in accordance to aspects of the present disclosure.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person in the art will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

Various terms are used herein consistent with their common meanings in the art. The following terms are defined below for clarity.

The term "about" as used herein denotes a variation of at most 10% around a numerical value, unless context dictates otherwise.

The disclosure relates to powder metallurgy to a method for producing nanoscale and ultrafine powders of polyvalent iron oxides in the aqueous solutions. The technical result of which is the automation of the technological process, improvement of working and environmental conditions of production, reduction of energy costs as the cost of the final product, as well as the possibility of a large volume batch production is achieved. The production of nanodispersed polyvalent iron oxide powders can find a wide use in the nano-, petroleum, chemical and electronic industries, as well as medicine, energy, biology and agriculture, etc.

Additionally, minor adjustments to the process can change spherical and morphological properties of the metal particles and we can change surface properties of the metal particles that allow for easier coating with carbohydrates (such as carboxymaltose), sugars or amino acids which in turn can allow better absorption in humans so potentially obviating the need for IRON INFUSIONS in humans as orally administered products would potentially work better than IRON INFUSIONS as the EED manufactured iron particles could be delivered through the gut wall of humans and animals similarly to FERINJECT® of Vifor Pharma. This way the iron could be absorbed into the bloodstream through the GI tract. EED iron as $Fe3+$ may also allow IRON INFUSIONS to be improved by allowing improved coating of specialized iron nanoparticles with shape and surface characteristics that allow new coating technologies.

As discussed in more detail below, in some embodiments, submicron and nanometer-sized particles are fabricated using an electroerosion dispersion (EED) system comprising: (i) a plasma reactor comprising two electrodes, a circulating fluid, and a loading port to load material into the plasma reactor; (ii) a generator connected to the electrodes to provide discharges into the plasma reactor; (III) a sedimentation tank where the fabricated particles settle; and (iv) a pump connected to the plasma reactor and the sedimentation tank in order to circulate the fluid. The EED system may also be designed to have the circulating fluid transport the fabricated particles from the plasma reactor to the sedimentation tank. Submicron and nanometer-sized particles, e.g., submicron and nanometer-sized metal oxide particles, with unique properties can be fabricated from bulk metal materials using the EED system. Without being limited to any particular theory, in some embodiments, the bulk metal materials are heated to relatively high temperatures in the plasma reactor due to the plasma generated by the pulse electric discharges. This results in the evaporation of the bulk material which subsequently condensed in micro-droplets in a cooler region of the plasma reactor. In an oxygen-containing medium (e.g., water), the condensed droplets can be oxidized by the oxygen to form metal oxide particles. In certain embodiments, the oxygen is generated by the plasma due to the decomposition of water. Under non-equilibrium conditions caused by the short discharges, metal particles and metal oxide particles with different compositions, oxidation states, and sizes can be fabricated.

In some cases, the stoichiometry of the fabricated particles depends on the characteristics of the raw materials (i.e., composition, chips, cuttings, shavings, granules, impurities, etc.) and characteristics of the circulating fluid (i.e., composition, temperature, velocity, etc.), as well as on the stoichiometry of the electrode material. Varying the above factors and controlling the parameters of the electrical discharges (e.g., voltage, frequency of discharges, and shape of pulses) can determine the characteristics of the fabricated particles such as the composition, size of grains (i.e., from several nanometers up to several microns), their shape (spherical or with a highly developed surface), and phase (e.g., amorphous, glassy, and crystalline). Changing the type and the composition of the circulating fluid (e.g., water, spirit, kerosene, etc.) with suitable additions can provide the possibility to synthesize pure metals, oxides, carbides or nitrides. The method disclosed herein allows the fabrication of particles suitable for the production of materials with unique characteristics (e.g., refractoriness, hardness, ductility, brittleness, radioactivity, chemical activity, magnetic properties, and sorption ability).

In some embodiments, the raw material is in the form of granules, shavings, regularly shaped particles, or irregularly shaped particles. The raw materials can be one or more of iron, cast iron, or steel. In other embodiments, the raw material is an iron ore. Examples of iron ores are not limited and include one or more of magnetite, hematite, goethite, limonite, or siderite.

In some embodiments, the circulating fluid can have a temperature of at least 20° C., or at least 25° C., or at least 30° C., or at least 40° C., or at least 50° C., or at least 60° C., or at least 70° C., or at least 80° C., or at least 90° C. In some embodiments, the circulating fluid can circulate through the plasma reactor during the fabrication of the particles. In some embodiments, the circulating fluid can stop circulate during the fabrication of the particles. In some embodiments, the circulating fluid can have a flow rate between about 0.01 liter per minute and about 60 liter per minute, or between about 0.1 liter per minute and about 40 liter per minute, or between about 1 liter per minute and about 20 liter per minute, or between about 2 liter per minute and about 10 liter per minute, or between about 2 liter per minute and about 5 liter per minute, or between about 2 liter per minute and about 3 liter per minute. In some embodiments, the circulating fluid can have a flow rate of at least 0.01 liter per minute, or at least 0.1 liter per minute, or at least 1 liter per minute, or at least 2 liter per minute, or at least 3 liter per minute, or at least 5 liter per minute, or at least 10 liter per minute, or at least 20 liter per minute, or at least 40 liter per minute, or at least 60 liter per minute.

In some embodiments, the fabricated EED particles have a size of about, about 2 nm to about 60 μm, or a size of about 2 nm to about 30 μm, or a size of about 2 nm to about 15 μm, or a size of about 2 nm to about 10 μm, or a size of about 2 nm to about 5 μm, or a size of about 2 nm to about 1 μm, or a size of about 2 nm to about 0.5 μm, or a size of about 2 nm to about 0.1 μm, or a size of about 2 nm to about 0.2 μm, or a size of about 2 nm to about 0.05 μm, or a size of about 2 nm to about 100 nm, 2 nm to about 200 nm, or about 2 nm to about 300 nm, or about 2 nm to about 400 nm, or about 2 nm to about 500 nm. In certain embodiments, when iron infusion ready particles for medicinal use the $Fe^{3+}$ particle size is typically between about 60 nm and about 180 nm. In some embodiments, the impurities in the fabricated particles are the same as in the starting materials. In other embodiments, the impurities in the fabricated particles are different than in the starting materials.

The fabrication of metal particles by electroerosion dispersion (EED) has several advantages. For instance, the fabricated particles can be relatively pure, monodispersed, of different sizes (i.e., micron size, submicron size, and nanometer size), of different shapes (i.e., spherical or highly developed surface and high density of dislocations), of different phases (i.e., amorphous, glassy and crystalline), and with unique properties (e.g., magnetic properties, chemical active sorbent and coagulant). In addition, the EED process is ecologically friendly (i.e., no drain is necessary, though one can be used if desired, and no gas and dust are emitted), requires low specific energy (i.e., about 1.5-3 kW for the production of about 1 kg of particles), involves equipment that is compact, and can be scaled-up easily.

EED metal particles and their oxides can be used in many applications. By way of example, EED particles can be used for the purification of liquid samples and as additives in 3D printing. In EED printing the character of the metal particles can be altered to simplify the 3D printing process and add tensile strength to the printed metal object. By way of example, nickel EED particles and particle oxides can be used in the following ways: for the production of catalysts, coatings, polymers, textiles, batteries, porcelain, pigments, and aircraft components; in electronic, optical, and medicinal devices; and to generally substitute platinum in different applications. By way of example, copper EED particles and particle oxides can be used in the following ways: in aviation, biology, and metallurgy; as antimicrobial and fungicidal compounds; and in electronic and optical devices. By way of example, iron EED particles and particle oxides can be used in the following ways: for the purification of water; for the production of magnets, ferrites, coatings, polymers, and metallurgic powder; in medicine and biology as a pharmaceutical composition or as a supplement; in memory storage devices; and as additive such as a strengthener or filler. By way of example, aluminum EED particles and particle oxides can be used in the following ways: for the purification of water; and for the production of jewelries, optical lenses, grinding pastes, and rocket fuel. By way of example, titanium EED particles and particle oxides can be used in the following ways: as antimicrobial, fungicidal, UV stabilizer, and additive compounds; in high-strength coatings; in the manufacture of pigments; and in metallurgic powder. By way of example, zinc EED particles and particle oxides can be used in the following ways: as antimicrobial and fungicidal compounds; and in the production of polymers, textiles, coatings, hydrogen fuel cells, solar panels, and metallurgic powder. By way of example, tungsten EED particles and particle oxides can be used in the production of wear resistant coatings, cutting and drilling tools, armor piercing cores, contacts for high current switches, and metallurgic powder. By way of example, molybdenum EED particles and particle oxides can be used in the following ways: as catalyst; and in the production of coatings, polymers, corrosion inhibitors, and metallurgic powder. By way of example, silver EED particles and particle oxides can be used in the following ways: as antibacterial substance, catalyst, and additive; and in coatings aircraft components. By way of example, gold EED particles and particle oxides can be used in the following ways: in electronics, medicine, aviation, and jewelry; and as catalyst and additive. By way of example, platinum EED particles and particle oxides can be used in the following ways: in electronics, medicine, and aviation; in the production of hydrogen fuel cells, precision mechanic products; and as additive.

In some embodiments, the EED particles are formed of one or more of iron, iron oxide, or iron hydroxide, or combination of one or more of the preceding compositions. Examples of the iron are not limited, and include iron alone or iron as a compound or alloy with one or more of chromium, copper, molybdenum, zinc, cobalt, nickel, cadmium, manganese, arsenic, tin, lead, aluminum, cesium, and strontium. The iron may include also Ferricoxyhydroxide and other Ferric iron. As an iron oxide, the oxides include iron $Fe^{3+}$, $Fe^{2+}$, $Fe+O+OH$, $Fe\ 3+OH$, iron (II) oxides including $FeO$, $FeO_2$, $Fe_3O_4$, $Fe_4O_5$, $Fe_5O_6$, $Fe_5O_7$, $Fe_{25}O_{32}$, $Fe_{13}O_{19}$, iron (III) oxides including $Fe_2O_3$, $\alpha\text{-}Fe_2O_3$ (alpha phase), $\beta\text{-}Fe_2O_3$ (beta phase), $\gamma\text{-}Fe2O3$ (gamma phase), or $\varepsilon\text{-}Fe2O3$ (epsilon phase). Examples of iron hydroxides include iron(II) hydroxide ($Fe(OH)_2$) and iron (III) hydroxide ($Fe(OH)_3$), iron (III) oxide hydroxide, hydrates of iron (III) oxyhydroxide (ferric oxyhydride), and combinations thereof.

In these embodiments, the iron oxide EED particles are effective for the extraction of ions of metals and heavy metals from liquid samples. These metals comprise, for example and without limitation, iron, chromium, copper, molybdenum, zinc, cobalt, nickel, cadmium, manganese, arsenic, tin, and lead. In other embodiments, alumina EED particles are fabricated. In these embodiments, the alumina EED particles are effective for the extraction of ions of metals and heavy metals from liquid samples. These metals comprise, for example and without limitation, iron, chromium, copper, molybdenum, zinc, cobalt, nickel, cadmium, manganese, arsenic, tin, lead, aluminum, barium, cesium, and strontium.

The extraction of ions of metals and heavy metals from liquid samples can be done by mixing dry or undried powder comprising EED particles with the liquid sample. By way of example, the EED particles can be iron oxide EED particles, alumina EED particles, or a combination thereof. The mixture can then be left stagnant, mixed manually, or mixed using a shaker, a sonicator, a magnetic stir bar, a vortex, or any combinations thereof for a predefined period of time. The predefined period of time can be between about 2 minutes and about 240 minutes, or between about 2 minutes and about 180 minutes, or between about 2 minutes and about 120 minutes, or between about 2 minutes and about 60 minutes, or between about 2 minutes and about 30 minutes, or between about 2 minutes and about 15 minutes, or between about 2 minutes and about 8 minutes, or between about 2 minutes to about 4 minutes. After the EED particles reacted with the ions, the reacted metal particles can coagulate to form a slurry. The slurry can then be passed through a filter. The filter can have a mesh size between about 0.05 µm and about 100 µm, or between about 0.05 µm and about 50 µm, or between about 0.1 µm and about 25 µm, or between about 0.5 µm and about 15 µm, between about 1 µm and about 10 µm, about 100 nm to about 500 nm, about 100 nm to about 200 nm, about 100 nm to about 300 nm, or about 100 nm to about 400 nm. In some embodiments, the filter can have a mesh size of about 0.05 µm, or about 0.1 µm, or about 0.5 µm, or about 1 µm, or about 10 µm, or about 15 µm, or about 25 µm, or about 50 µm, or about 100 µm. The degree of extraction of ions from the liquid sample can be between about 50% and about 100%, or between about 60% and about 100%, or between about 70% and about 100%, or between about 80% and about 100%, or between about 90% and about 100%, or between about 95% and about 100%, or between about 99% and about 100%, or between about 99.5% and about 100%. In some embodiments, the degree of extraction of ions from the liquid sample can be at least 50%, or at least 60%, or at least 70%, or at least 80%, or at least 90%, or at least 95%, or at least 99%.

In some embodiments, the EED particles have electromagnetic properties and are able to absorb microwaves. In these embodiments, the fabricated EED particles absorb microwaves at values similar or greater than commercially available particles. By way of example, some iron oxide EED particles disclosed herein enable microwave absorption values similar to hexaferrite powders and greater to iron oxide Magsilica® powder. Applications involving high-frequency electromagnetic fields (e.g., satellite-TV, mobile phone, WLAN technologies, radar for traffic and aerial supervision, microwave heating, drying, sintering, up to automotive and medical applications) require low-cost absorbing materials such as the iron oxide EED particles disclosed herein in order to reduce the electromagnetic radiation exposure on biological systems and assure the safe and secure operation of instruments and equipment (e.g., prevention of wireless signal leakages). The iron oxide EED particles disclosed herein can also be used to fabricate composites for microwave induced curing and bonding or magnetically soft composite materials.

In some embodiments, the EED particles have other uses. By way of example, the particles can be used as one or more of an inactive ingredient in a pharmaceutical composition, an active ingredient in a pharmaceutical composition (optionally with a carbohydrate coating to allow precise delivery in the GI tract or such other absorption site as is desired), an inactive ingredient in a dietary supplement, an active ingredient in a dietary supplement (such as where the metal has nutritional benefits if ingested by humans or animals), an adsorbent material, an absorbent material, as a mineral supplement for crop production, as a feedstock for powder metallurgy (whether for ceramics or metal alloys), as a nucleation agent for metallurgical applications, as a nucleation agent for chemical applications, as an industrial catalyst (for example, where $Al_2O_3$ particle are used alone or in combination with other catalysts for hydrogen production or reforming in transportation or stationary applications, such as propulsion of motor vehicles, boats, ships, airplanes, rockets, trains, trucks, and the like), as a laboratory catalyst, as a support particle or substrate particle for a separate catalyst, a preservative or oxidation preventer or stabilizer in pharmaceutical compositions, or as a preservative or oxidation preventer or stabilizer in dietary supplements. In some embodiments, the EED particles are formed as part of a complex that can be used in any of the preceding uses. For example, in one embodiment, the EED particles are used or included in one or more sodium ferric gluconate, sodium ferric carbohydrate complex, sodium ferric sucrose complex, sodium ferric maltose complex, sodium ferric carboxymaltose complex, sodium ferric dextrose complex and the like. In still other embodiments, the EED particles are formed as a complex with any amino acid. In still other advantageous embodiments, the EED particles are useful for inclusion in animal feed, which enables more rapid growth and weight gain, even when the same caloric feed intake is otherwise provided in the animal's diet. Such animals are not limited and include includes domesticated and wild animals, and includes one or more of horses, donkeys, cattle, zebu, bali cattle, yak, water buffalo, gayal, sheep, goat, reindeer, bactrian camel, Arabian camel, llama, alpaca, pig, rabbit, guinea pig, poultry (such as chickens, ducks, geese, turkeys, and the like), canines, felines, birds and the like.

In some embodiments, it is believed that the combination of unique particle compositions, microstructural morphology, surface area and morphological characteristics, and particle size, among others, increases the absorption and thereby the beneficial effects in humans or animals. In particular, by way of example, iron EED particles of the disclosure are believed to have increased absorption in humans as part of a dietary supplement or pharmaceutical composition. While not wishing to be bound by theory, it is believed that the iron EED particles of the disclosure have increased absorption that enables use as a pharmaceutical composition that is absorbed through the gastrointestinal tract.

Figure 2:
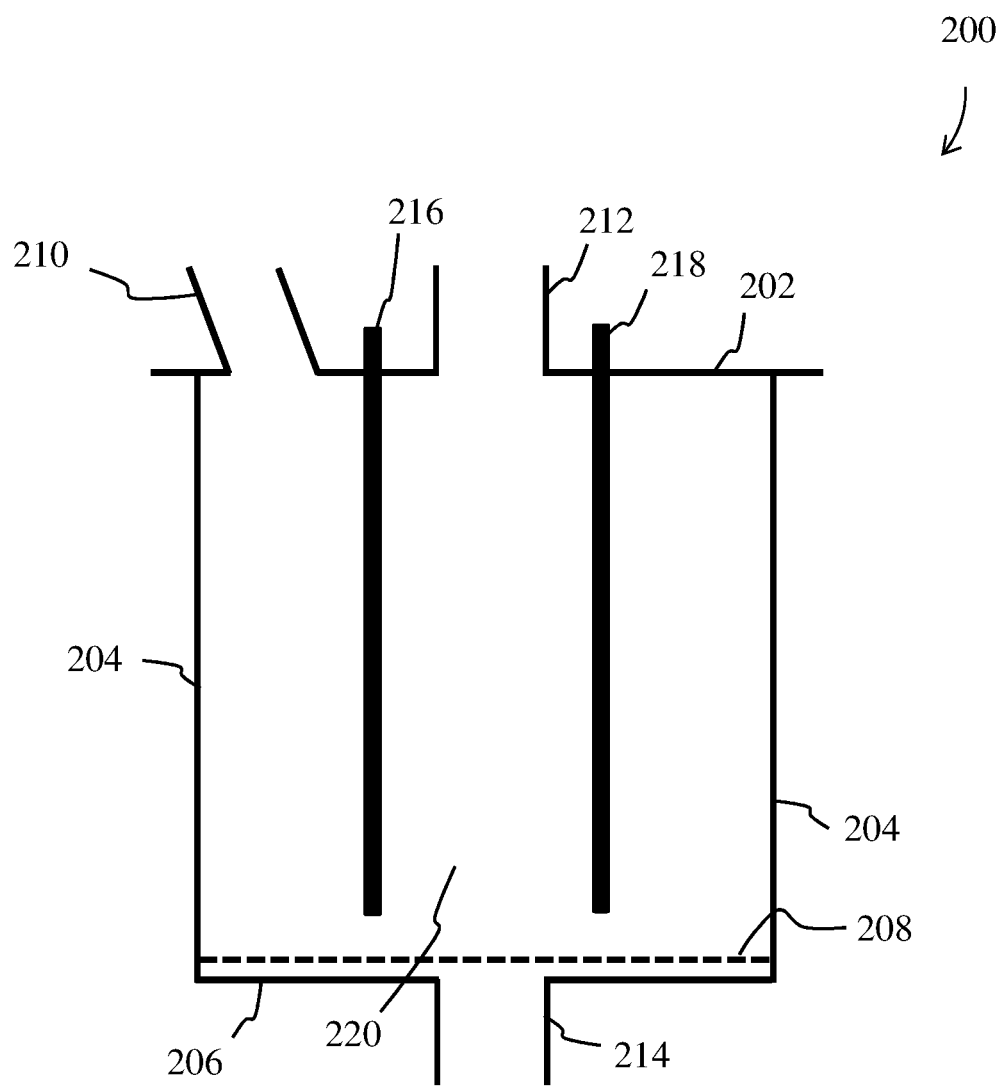
FIG. 2 is a schematic representation of a plasma reactor in accordance with aspects of the present disclosure.
Figure 3:
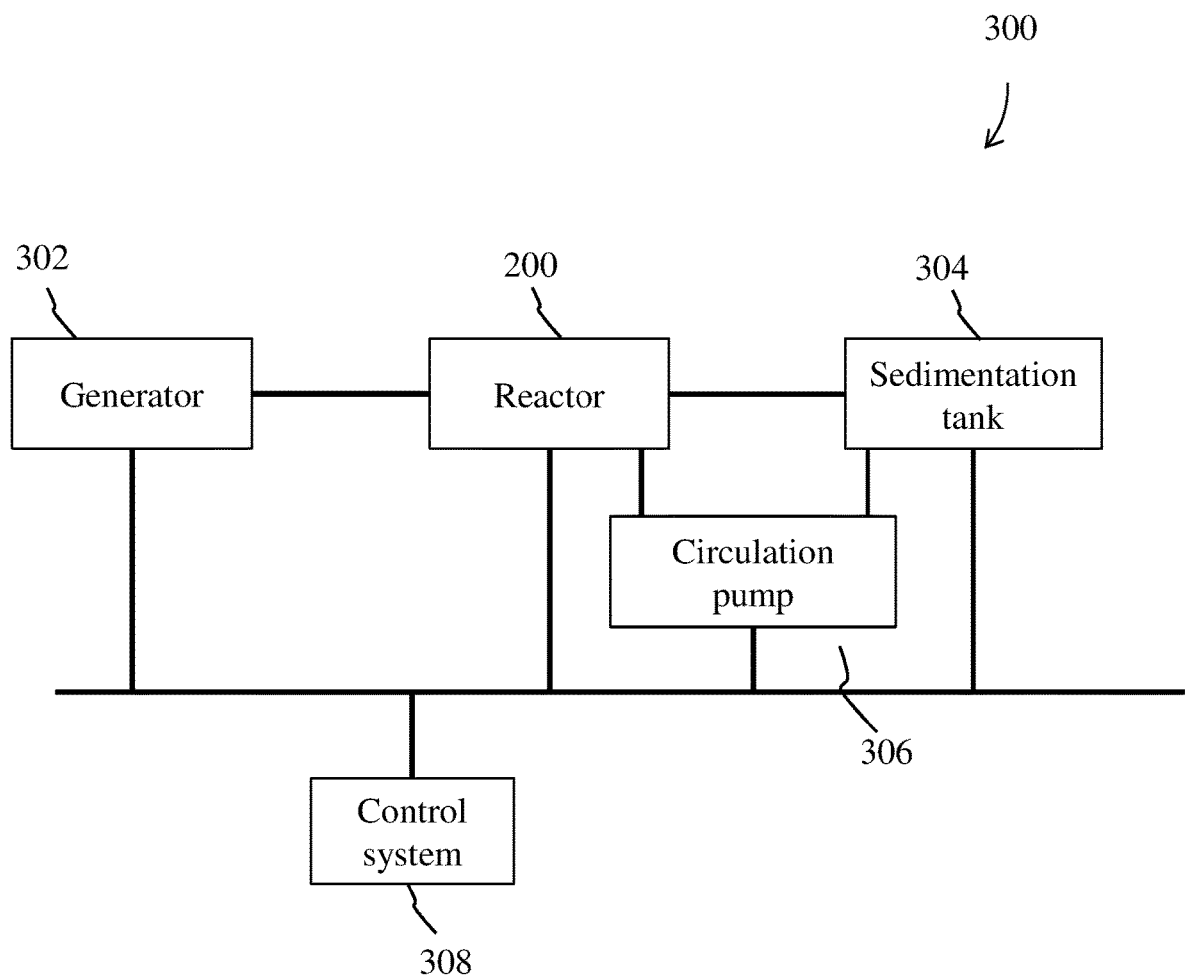
FIG. 3 is a schematic representation of an EED system that includes a generator, a plasma reactor, a sedimentation tank, a circulation pump, and a control system in accordance with aspects of the present disclosure.
Figure 4:
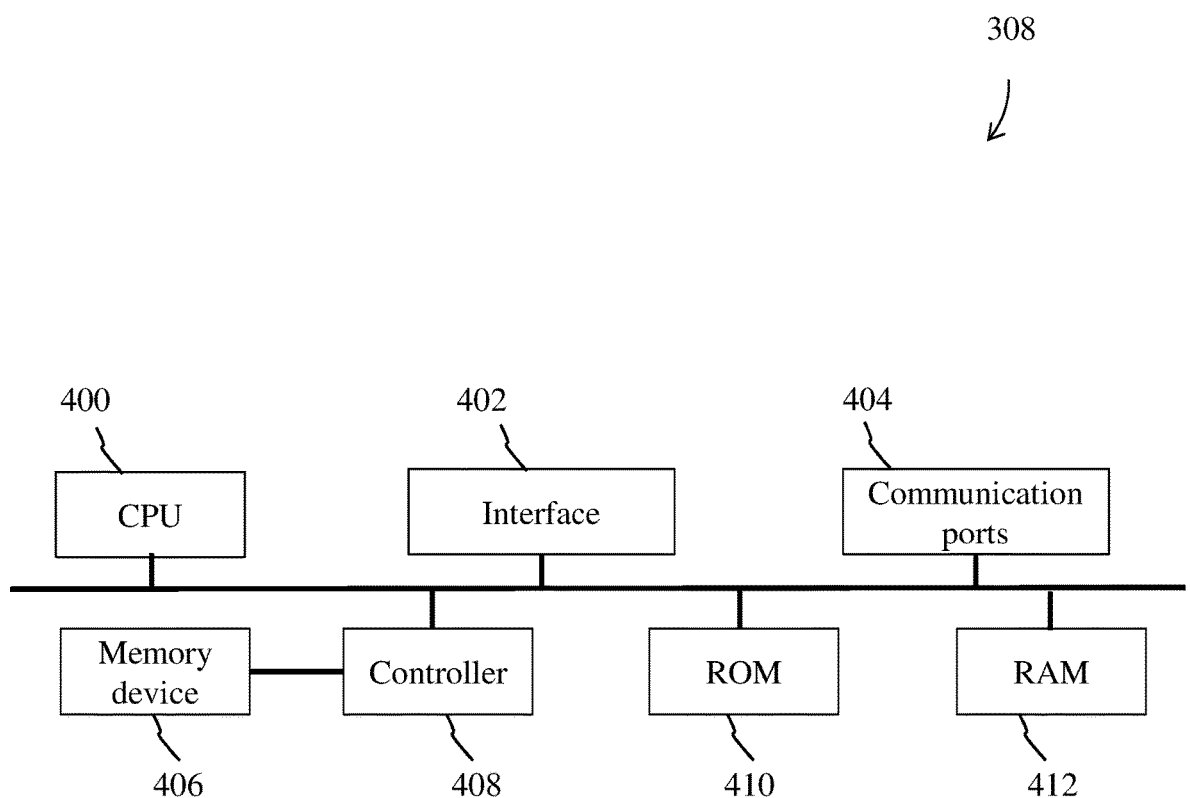
FIG. 4 is a schematic representation of a control system of an embodiment of an EED system, which includes a central processing unit (CPU), an interface, communication ports, a memory device, a controller, a read-only memory (ROM), and a random-access memory (RAM) in accordance to aspects of the present disclosures.

With reference to the flow chart of FIG. 1 as well as FIGS. 2-4, in a method of fabricating micron, submicron, and nanometer-sized particles according to one or more embodiments of the present teachings, one or more metallic elements can be added into a plasma reactor 200 in the presence of a circulating fluid such as an organic fluid, an inorganic fluid, or a combination thereof. By way of example, the inorganic fluid can be water, hydrogen peroxide, or a combination thereof. The circulating fluid can also contain other elements such as one or more electrolytes, monosaccharides, disaccharides, polysaccharides, or any combinations thereof. By way of example, the electrolyte can be sodium chloride, potassium chloride, calcium chloride, lithium chloride, ferric chloride, sodium nitrate, potassium nitrate, magnesium nitrate, potassium nitrate, silver nitrate, sodium acetate, ammonium acetate, sodium carbonate, potassium carbonate, calcium carbonate, sodium bicarbonate, copper sulfate, or any ions thereof, or any combinations thereof. By way of example, the monosaccharide can be glucose, fructose, galactose, or any combinations thereof. By way of example, the disaccharide can be maltose, sucrose, lactose, or any combinations thereof. By way of example, the polysaccharide can be cellulose, chitosan, pectin, starch, glycogen, or any combinations thereof. In some embodiments, the metallic elements used to fabricate the particles comprise alkali metal, alkaline earth metal, transition metal, post-transition metal, or metalloid, or any combinations thereof. Some examples of such metals include, without limitation, iron, aluminum, nickel, cobalt, tungsten, copper, zinc, lead, molybdenum, tantalum, tin, vanadium, chromium, titanium, niobium, silicon, and zirconium.

More specifically, the plasma reactor 200 includes a top part 202 comprising an inlet 210 designed to load materials into the plasma reactor, two electrodes (cathode/anode) 216 and 218 designed to apply discharges into the plasma reactor, and a channel 212 for circulating the fluid (not shown). The plasma reactor also includes one or more walls 204 and a bottom part 206 comprising a mesh bottom 208 for pumping the circulation fluid and a channel 214 for circulating the fluid. The plasma reactor defines a cavity space 220 where the particles are fabricated.

FIG. 3 schematically depicts an electroerosion dispersion (EED) system 300. In some embodiments, the EED system comprises in addition to the plasma reactor 200 a generator 302, a sedimentation tank 304, a circulation pump 306, and a control system 308. The metallic elements disposed in the plasma reactor 200 are evaporated to form metal vapor when plasma are generated by at least one electric discharge pulse from the electrodes 216 and 218. The metal vapor is then condensed to form metallic particles and the resulting particles are transported into the sedimentation tank 304 to be sedimented. The sediment is then removed from the sedimentation tank and sublimated, dried, and/or milled.

As noted above, the electroerosion dispersion (EED) system 300 includes a plurality of functional elements that can be controlled by one or more control systems. By way of example, FIG. 4 schematically depicts an exemplary implementation of the control system 308, which includes a central processing unit (CPU) 400 for controlling the operation of one or more elements of the system 300. The control system also includes an interface 402, communication ports 404 for communicating with various components of the system, memory device 406, a controller 408, a random access memory (RAM) 412, and a read only memory (ROM) 410. By way of example, instructions for the fabrication of particles can be stored in ROM 410, or, RAM 412, or other memory device 406, and the processor can access those instructions to control the operation of various functional units of the system under the control of the control system 308. By way of example, the instructions can provide the duration and power of each electric pulse generated into the plasma reactor as well as the velocity of the circulating fluid that pass through the plasma reactor.

The production of nanodispersed polyvalent iron oxide powders can find a wide use in the nano-, petroleum, chemical and electronic industries, as well as medicine, energy, biology and agriculture, etc.

In one embodiment, the EED process is started by loading the raw material into a reaction chamber. The reaction chamber is made of a dielectric or material. The dielectric material can be electrically insulating, thermally insulating, or both electrically and thermally insulating. During operation, cooled and recycled water is pumped through the reaction chamber. During operation, a pulse generator sends current discharges through one or more electrodes that have direct contact with a layer of the raw materials that reside within the reaction chamber.

The raw material is loaded onto a perforated partition that is installed inside the reaction chamber of the reactor which is made of a dielectric material. To ensure optical specific distribution density of migrating discharges in the layer of loaded feedstock, continuous circulation under pressure of recycled cooled and clarified water through the reaction chamber is performed. This causes a "pseudo-boiling layer" that is floating above the partition to prevent the formation of localized plasma discharges, which can lead to localized melting zones. In certain embodiments, one or more electrodes contact the feedstock in the plasma reactor. In some embodiments, the circulation under pressure of the recycled cooled and clarified water is used to achieve a "fluidized" layer of the raw material, such as when the raw material is in the form of granules. The amount of electrical discharge contacts in the feedstock layer remains at approximately the same level during the start and throughout the whole gradual dissolution of the EED process. Additionally, the frequency of the electric current applied by the electrodes is set between 500-800 Hz, the amplitude value of the current in pulses is within 8-20 kA, and the voltage is 100-800 V. Each of these values is by way of example only and can be varied depending on the required range of dispersion raw material and the resultant product.

Ensuring the optimal specific density of the distribution of migrating discharges in the layer of the loaded feedstock is achieved through continuous circulation of cooled and clarified water under pressure in the EED plasma reactor. In some embodiments, the total number of discharge contacts in the layer of the feedstock is maintained at approximately the same level both at the starting loading of the reactor and throughout the entire process of gradual electroerosive dissolution.

Figure 19:
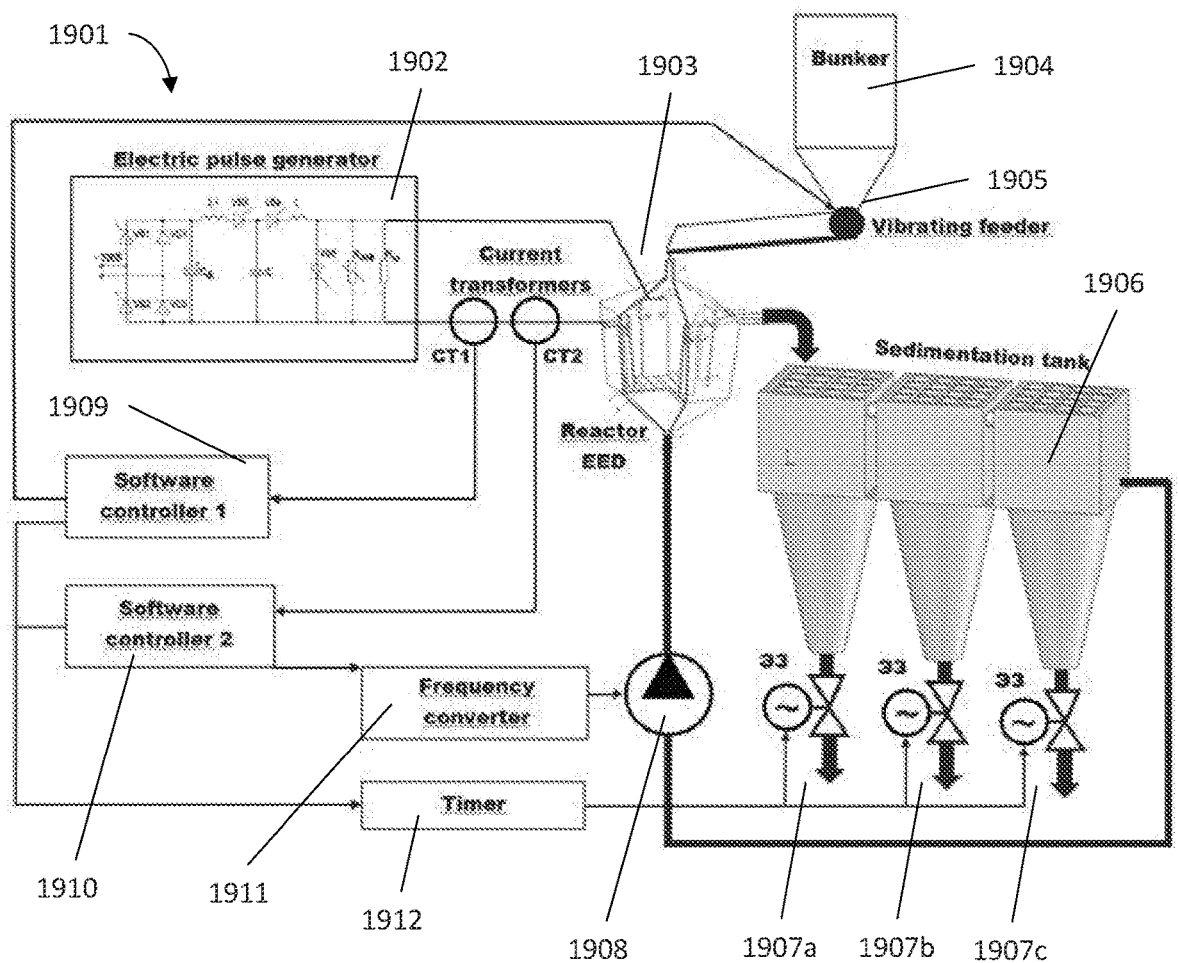
FIG. 19 is a diagram of an embodiment of the disclosure.

Referring now to FIG. 19, an embodiment of the EED apparatus 1901 and associated components is shown. Electric pulse generator 1902 generates electric pulses with controlled parameters including one or more of voltage, repetition rate, duty cycle, discharge current stabilization, pulse shape. The EED plasma reactor 1903 includes is where the process of electroerosive dispersion of granules (chips, shot, etc.) from iron, steel, cast iron is performed. The bunker 1904 is stores the raw material such as chips, shot, pellets, and the like that are to be loaded into the EED plasma reactor 1903. A vibrating feeder 1905 controls a dosed supply of raw material to the EED plasma reactor 1903. One or more sedimentation tanks 1906 settle the water suspension for the produced materials, such as magnetite, and also perform clarification and cooling of the working fluid. One or more electrical valves depicted as 1907a, 1907b, and 1907c automate the process of periodic unloading from the sedimentation tank capacity paste consisting that includes one or more of the working fluid and produced materials such as magnetite. A circulation pump 1908 circulates the working fluid so as to create a controlled fluidized layer of granules and continuous circulation of water in a closed circle. The working fluid circulates first through the EED plasma reactor 1903, followed by one or more sedimentation tanks 1906, and finally one or more of the electrical values 1907a, 1907b, and 1907c before returning to the pump 1908 and the plasma reactor 1903. Current transformers CT1 and CT2 are each designed to retrieve information about the average integrated current intensity of the discharge pulses that the pulse generator 1902 generates. This information serves to control the operation of the vibrating feeder and to maintain a predetermined level of the reactor load dispersion granules, the volume of which decreases as the granules are processed. The current transformer CT2 is designed to retrieve information about the instantaneous pulse current, which is used by a first software controller 1909 to control the operation of the vibrating feeder 1905 maintain a predetermined level of the reactor loading raw material, the volume of which decreases as the granules are processes. Furthermore, software controller 1910 controls the circulation pump 1908 by operating through a frequency converter 1911.

Based on the cumulative information about the time and operating modes of the apparatus, which is obtained by the first software controller 1909 and the second software controller 1910, the timer 1912 is controlled. Timer 1912 periodically opens one or more valves 1907a, 1907b, or 1907c with the electric drive and releases the settled magnetite paste from the sedimentation tank. Frequency converter 1911 is designed for a smooth change in the frequency of the supply network of the circulation pump 1908, and as a result the change of its pres sure-flow characteristics also occurs smoothly. This permits the "pseudo-boiling" of granules or "fluidized" layer of granules, thereby avoiding the formation of localized melting of the granules. The timer 1912 controls the remote opening of one or more of valves 1907a, 1907b, or 1907c to control the release from the sedimentation tank 1906 of the settled magnetite paste or other product.

Applicants have also characterized the conditions present in the plasma channels of the electrical microdischarges. In these plasma channels, the temperature is about $1 \times 10^{4\circ}$ C. to about $1.5 \times 10^{4\circ}$ C., and the amount of electric energy in the zones of spark contact between the granules is no more than about 1 J. As a result of volumetric electrospark processes during the dispersion of steel (cast iron, iron) granules or shavings in water at pulsed discharge currents of up to 20 kA, magnetite powders with particle sizes ranging from about 2 to about 3 nm are obtained. While not wishing to be bound by theory, the Applicant believes that with the corresponding parameters of pulsed discharges, the smallest particles, up to the atomic level, can be obtained by the EED method.

The size of the particles is determined by one or more durations of the electric discharge, the energy of the electric discharge, the physical parameter, dimensions and morphology of the dispersible parameters, the composition of the dispersible materials, the thermodynamic properties of the working fluid such as boiling point and heat capacity, and the hydraulic characteristics of the movement of the working fluid in the reactor.

In some embodiments, the specific energy consumption per formation of each particle is controlled to thereby control the size of the particles that are formed and maintain a specific density of the dispersion. This is achieved by stabilizing the integral discharge current of the pulse generator, selecting a pre-determined repetition rate of the discharge pulses and by reducing the duration of the discharge between granules. While not wishing to be bound by theory, given the intense and probabilistic nature of the emergence and migration of plasma channels in the volume of the granules, as well as the large number of spark contacts between the granules, a significant role in solving this problem is played by the hydrodynamic regulation of the pressure-flow characteristics of the circulation pump.

In one embodiment, the number of migrating discharge chains depends on the degree of loading of the plasma reactor. Thus, this can be controlled by adjusting the loading of the plasma reactor. When the plasma reactor is loaded to its maximum capacity of the raw material, the number of the migrating discharge chains is also at maximum. However, the loading should not be so high such that localized melting occurs instead of electroerosion.

In one embodiment, a two-channel mode of operation control is provided. This provides a flexible control system for stabilizing the dispersion of the produced magnetite. In particular, when the first software controller and the second software controller is used as described herein, this controls the peak current loads which can occur during location compaction of a layer of raw materials. This increases the dispersion of the raw material and therefore the operation lifetime of the equipment.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Materials

Iron chips and electrodes were made from structural grade carbon steels.

Polyvalent iron oxides were made from carbon steel (St3 (DSTU 2651-94/GOST 380-94), A568M (ASTM International), or 1.0116 (DIN EN 10025)).

Tap water was used during the fabrication of EED particles.

MagSilica® and Ti substituted barium hexaferrite powders were used as reference materials for the analysis of the heating behavior of the EED particles. MagSilica® is a nanoscale oxide powder with a core of $Fe_3O_4$ and shell of $SiO_2$. The powder is used in adhesives to bond materials such as glasses and plastics. Ti substituted barium hexaferrite powder was developed for the production of electromagnetic shielding materials in the microwave range and for the bonding/debonding that is supported with high frequency fields.

Figure 5:
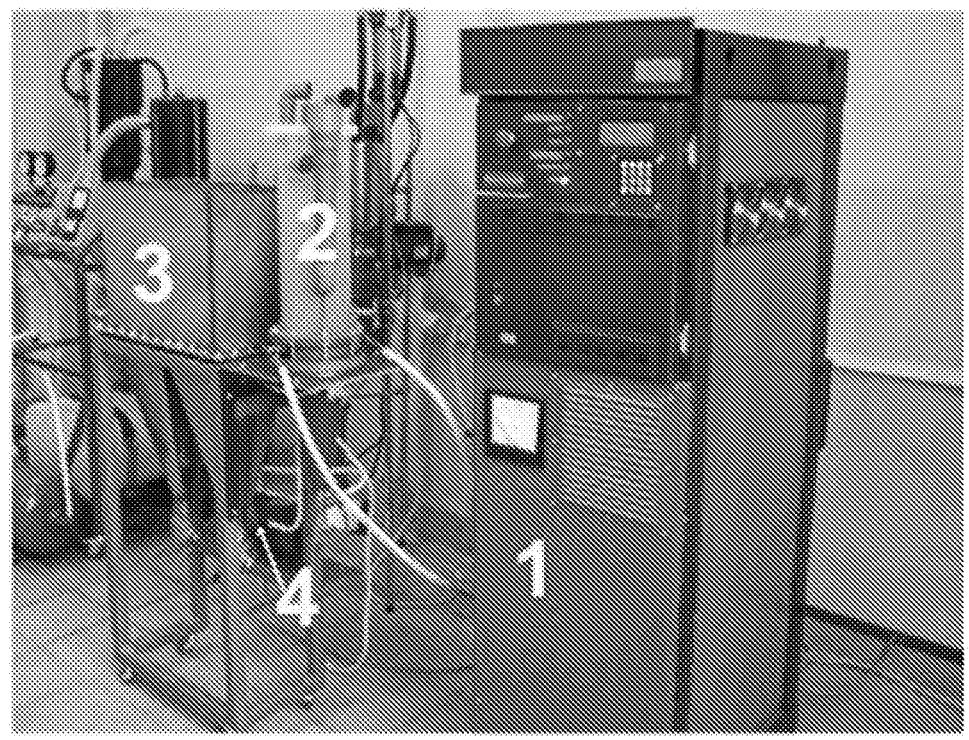
FIG. 5 is an image depicting a laboratory installation for the electroerosion dispersion of metallic elements in accordance with aspects of the present disclosure.

Laboratory Installation for the Electroerosion Dispersion Fabrication of Metal Particles Metal particles were fabricated using an electroerosion dispersion (EED) laboratory installation (FIG. 5). The EED installation comprised a pulse generator 1, a tank 2, a sedimentation tank 3, and a pump 4.

The area occupied by the EED installation was about 5 m² to about 7 m². The pulse generator 1 generated discharges within the plasma reactor 2 at a broad range of frequency and voltage (i.e., about 100 Hz to about 500 Hz, about 10 Hz to about 1000 Hz, about 100 V to about 500 V, or about 10 V to about 800 V). Both the plasma reactor 2 and the sedimentation tank 3 were connected with the pump 4. The EED installation required low specific energy intensity (i.e., about 1.5 kW to about 3 kW) to produce about 1 kg of particles. The rate of synthesis was about 1 kg/h to about 2 kg/h. However, the productivity of the EED installation could have been raised up to about 5 kg/h by increasing the plasma reactor volume to about 20 L. The EED process was environmentally acceptable without effluents, gaseous, or particulate emissions. The EED method allowed temperature gradients up to about $10^6$ K/mm. Metal vapor and micro-droplets solidified almost immediately ($\tau \approx 10^{-6}$ s) in a cold zone. Such conditions to fabricate particles resulted in particles with unique grain properties (e.g., deformation of crystalline lattices, high dislocation density, and high specific surface or surface area of the grains).

Characterization

The density of the EED particles was measured. Specifically, the EED particles were first dried in a vacuumed desiccator by gas pycnometry with argon using an AccuPyc II 1340 instrument (marketed by Micromeritics Instrument Corporation of Norcross, U.S.A.) and then analyzed by High-precision Mass Measurement using a Balance MC 210 P instrument (marketed by Sratorius AG of Göttingen, Germany).

The particle size distribution of the EED particles was measured. Specifically, the EED particles were first diluted in double-distilled water to a sample concentration of 0.15 mg/mL and sonicated for 3 min in a bath sonicator using an Sonorex Digital 10P instrument (marketed by Bandelin electronic GmbH & Co. KG of Berlin, Germany) at 35 kHz to deagglomerate and disperse the particles. The EED particles were then analyzed by Dynamic Light Scattering using a Malvern Zetasizer 3000 HS instrument (Malvern Instruments Inc. of Malvern, U.K.). Each sample was measured three times and statistically evaluated.

The size and morphology of the primary particles, aggregates, and agglomerates of the EED particles were measured by Transmission Electron Microscope (TEM) using a Tecnai 20S instrument (marketed by FEI Company of Hillsboro, U.S.A.) and by Scanning Electron Microscopy (SEM) using a Hitachi S-4800 instrument (marketed by Hitachi Ltd. of Mississauga, Canada).

The phase analyses of the EED particles were performed. Specifically, the phase analyses were carried out with the Siemens/Bruker D-5000 X-ray Diffractometer (XRD) system (marketed by Bruker Corporation of Billerica, U.S.A.) with theta/theta vertical goniometer system with optional spinner (phi) rotation (Bragg Brentano configuration) and Cu-kα radiation ($\lambda$=1.540598 Å). The measurements were performed at room temperature and the phases were identified by comparing the measured patterns to the JCPDS (Joint Committee on Powder Diffraction Standards) data cards (International Centre for Diffraction Data, PDF-2 2018).

Cerimetry and cerimetric titrations to determinate the $Fe^{2+}$ amount in the EED particles were performed. Specifically, redox titration, in which $Ce^{4+}$ oxidizes $Fe^{2+}$ to $Fe^{3+}$ and the electrochemical potential were monitored, was used. The experimental design consisted of a Pt indicator electrode and a calomel reference electrode. In order to prepare the sample for analysis, 300 mg of the EED particles was heated for 2 h with 100 mL of 8.5 M HCl at 95° C. under $N_2$ current to achieve its complete dissolution. After cooling for some minutes, 20 mL of 40% $HClO_4$ and 100 mL of bi-distilled gas-free water were added to the sample. The titrant was a standardized solution of 0.1 M Ce $(SO_4)_2$.

The magnetization of the EED particles was measured. Specifically, the measurement was done with a Vibrating Sample Magnetometer (VSM) 293904C instrument (marked by Princeton Instruments of Trenton, U.S.A.) using powder samples with a mass of about 40 mg at room temperature and in the range of the applied magnetic field strength of $H_0 = \pm 1.15 \times 10^6$ A/m. The measured curves $m(H_0)$ were converted to M(H) with the equations (I) and (II):

$$M = \frac{\rho_s m}{m_s} \quad (I)$$

wherein M is the magnetization, m is the measured magnetic moment, $m_s$ is the sample mass and $\rho_S$ is the sample density, and $$H = H_0 - N \cdot M \quad (II)$$

wherein H is the magnetic field strength in the sample, $H_0$ is the applied magnetic field strength, and N is the demagnetization factor.

The demagnetization factor N of each prepared sample was iteratively determined by the slope $\tan\alpha$ of the hysteresis loop M(H) in point $H={_J}H_c$ with the equation (III):

$$N = (\tan\alpha)_{H={_J}H_c} = \frac{\Delta M}{\Delta H}.\quad\text{(III)}$$

The magnetic parameters, specifically the saturation magnetization ($M_S$) and the magnetic coercivity (${_J}H_C$) remanence ($M_r$), were deduced from the corrected hysteresis loop M(H). The index J characterized the coercivity at the magnetic polarization J at zero value.

The microwave absorption of the synthesized EED particles was measured. Specifically, measurement of the heating curves ($\Delta\vartheta(t)$) of samples was performed with the same mass (1 g) packed in a silica glass crucible (inner diameter 20 mm) and located in a special microwave oven type AFKP® MW 17.3 (marketed by AFK Deutschland GmbH of Hamburg, Germany) at 2.45 GHz equipped with an IR sensor Optris CT® (marketed by Optris GmbH of Berlin, Germany). The measurements were repeated three times to determine changes caused by the temperature (e.g. by oxidation).

Example 1

Fabrication of Tic/Ti/Al EED Particles

Figure 6A:
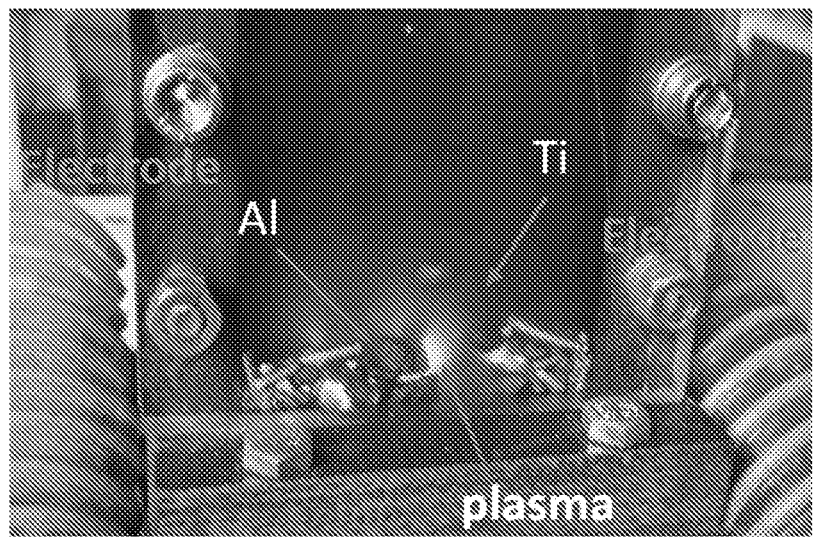
FIG. 6A is an image depicting a top view of an EED plasma reactor for the dispersion of Ti and Al in liquid in accordance with aspects of the present disclosure.
Figure 6B:
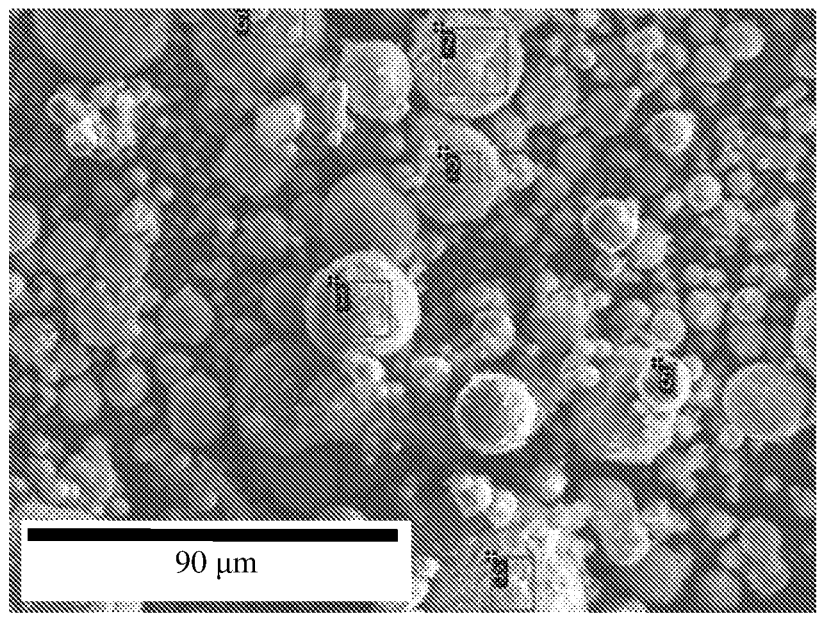
FIG. 6B is an image depicting EEC particles comprising TiC, Ti, and Al in accordance to aspects of the present disclosure (scale bar, 90 µm)

Tic/Ti/Al particles were fabricated using electroerosion dispersion (EED) (FIGS. 6A-B) Specifically, aluminum and titanium bulk materials were dispersed by EED in a liquid (FIG. 6A), wherein the liquid was constantly pumped through the plasma reactor and the plasma reactor comprised two electrodes and a plasma. The resulting EED particles had a diameter in the micron and submicron range (FIG. 6B).

Example 2

Fabrication of Iron Oxide EED Particles

Figure 7A:
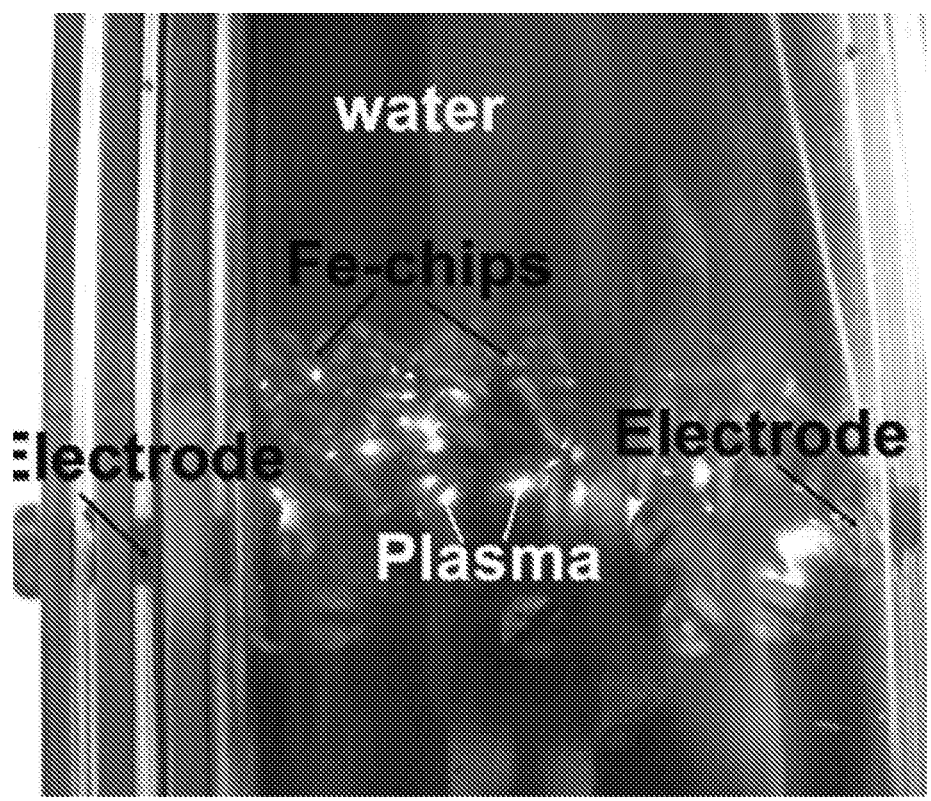
FIG. 7A is an image depicting a top view of an EED plasma reactor for the synthesis of iron oxide particles using Fe-chips in accordance with aspects of the present disclosure.
Figure 7B:
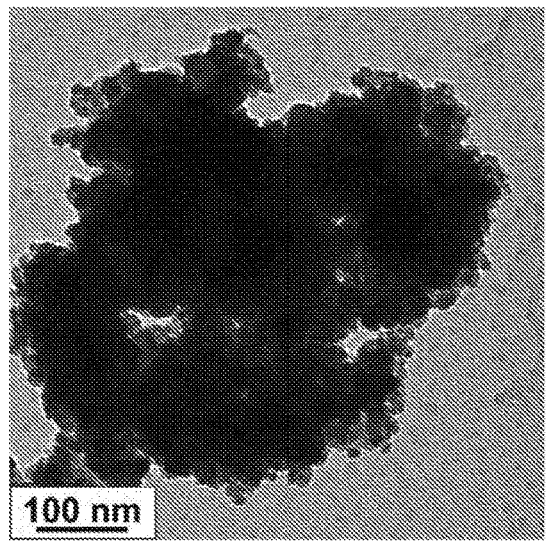
FIG. 7B is a Transmission Electron Microscope (TEM) bright-field image depicting agglomerates of iron oxide EED particles in accordance with an embodiment of the present disclosure (scale bar, 100 nm)
Figure 7C:
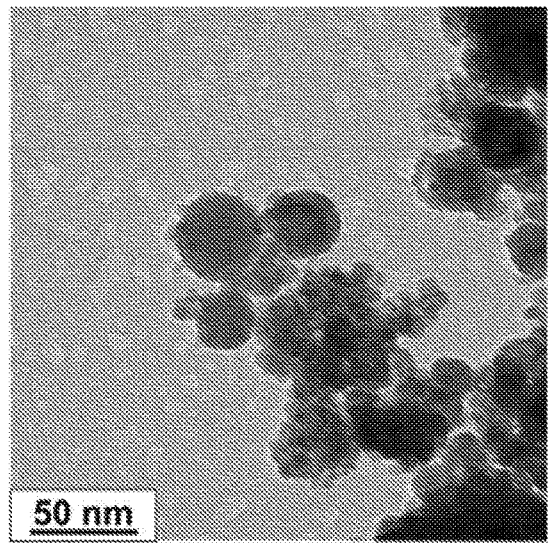
FIG. 7C is a TEM bright-field image depicting agglomerates of iron oxide EED particles with primary particles of about 20 nm to about 50 nm in diameter in accordance with an embodiment of the present disclosure (scale bar, 50 nm)
Figure 7D:
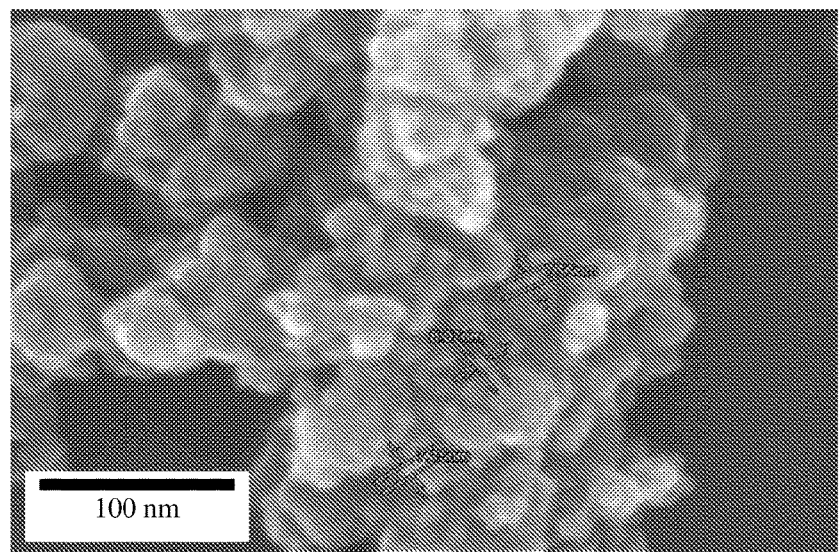
FIG. 7D is a Scanning Electron Microscopy (SEM) image depicting agglomerates of iron oxide EED particles with primary particles of about 7 nm to about 8 nm in diameter in accordance with an embodiment of the present disclosure (scale bar, 100 nm)

Iron oxide particles were fabricated using electroerosion dispersion (EED) (FIGS. 7A-D). Specifically, metal iron chips were dispersed by EED in water, wherein the water was constantly pumped through the plasma reactor and the plasma reactor comprised two electrodes and a plasma (FIG. 7A). The particles were transported to the sedimentation tank, wherein the sedimentation process proceeded. The sediment was removed from the sedimentation tank and sublimated, dried in vacuum or air and finally milled for a short time. The resulting EED particles formed agglomerates (FIG. 7B), had primary particles of about 20 to about 50 nm in diameter (FIG. 7C), and had particles of about 7 nm to about 8 nm in diameter (FIG. 7D).

Example 3

Density and Size of Iron Oxide EED Particles

The density and particle size of iron oxide EED particles were measures (FIG. 8). The density of the EED particles before (5.347±0.015 g/cm$^3$) and after (5.393±0.036 g/cm$^3$) microwave heating were approximately the same or slightly larger than the theoretical density of magnetite ($\rho_{th}$=5.175 g/cm$^3$) because the synthesized iron oxide EED particles contained additional heavy phases, e.g. Fe with a theoretical density of 7.874 g/cm$^3$ and/or FeO with a theoretical density of 5.88 g/cm$^3$, as revealed by the results of the phase analysis presented below. The measured particle sizes were in the range of $D_{10,3}$=3.6 μm up to $D_{90,3}$=11.8 μm in which the indices characterize the percentages of the volume weighted values. The measured particle sizes reflect, in part, the sizes of the particle aggregates and agglomerates rather than the sizes of the synthesized primary particles.

Example 4

Phase Analysis of Iron Oxide EED Particles

Figure 9:
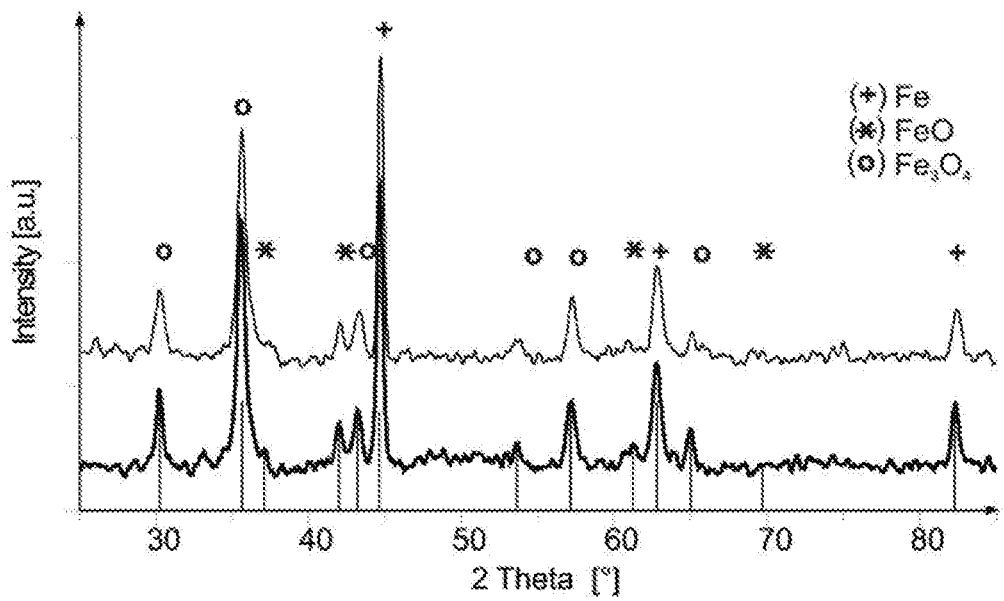
FIG. 9 is a plurality of graphs presenting the X-ray Diffractometer (XRD) diagram of iron oxide EED particles before microwave heating (dark bottom line) and after microwave heating (thin top line) in accordance with aspects of the present disclosure.

The phase analyses of iron oxide EED particles were performed (FIG. 9). The two diagrams presented in FIG. 9 show the results from the X-ray diffraction analysis of EED particles before (bottom dark line) and after (top light line) microwave heating. The main phase of both EED particles was magnetite ($Fe_3O_4$). The second detected phase with a smaller fraction was metallic iron (Fe). Another detected phase was wustite (FeO). This correlates well with the conclusions from the measured densities presented in FIG. 8 and discussed above. Furthermore, these results indicate that the solidification of the generated iron vapor and the micro-droplets during the EED process was too fast and/or the oxygen production was not enough so that reducing conditions developed. Similar phase compositions and particle sizes were also obtained in other iron oxide particles synthesized with electric discharges in water.

Example 5

Magnetic Properties of Iron Oxide EED Particles

Figure 10:
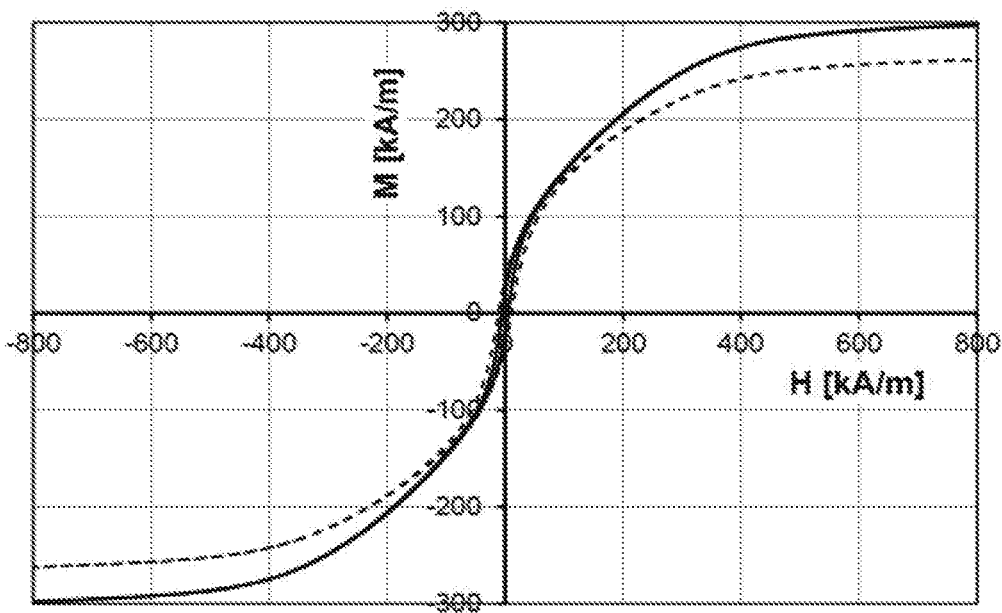
FIG. 10 is a plurality of graphs presenting the hysteresis curve of iron oxide EED particles before microwave heating (dark line) and after microwave heating (dashed line) in accordance with aspects of the present disclosure.

The magnetic properties of iron oxide EED particles were analyzed (FIGS. 10 and 11).

FIG. 10 shows two hysteresis curves of iron oxide EED particles. The curves are corrected hysteresis curve before (dark line) and after (thin dashed line) microwave heating. The EED particles showed magnetic properties (i.e., saturation magnetization, Ms=301.0 kA/m; and saturation polarization, JS=378.2 mT). Both hysteresis curves show the soft magnetic behavior while $Fe_3O_4$ is the main phase of the EED particles. Furthermore, the influence of heating under air atmosphere during the microwave annulling was observed. The saturation magnetization ($M_S$) decreases and the coercivity (${_J}H_c$) increases as expected for the iron oxide particles with contents of Fe and FeO due to the oxidation of these phase fractions during the microwave heating.

FIG. 11 shows the magnetic values of iron oxide EED particles, $Fe_3O_4$, and Fe at room temperature. The saturation magnetization ($M_S$) of the iron oxide EED particles is larger than the known magnetic values of $Fe_3O_4$, but smaller than that of nanoscale Fe particles. In this context, the magnetic properties of ferro-/ferrimagnetic materials are considered dependent on the size of the materials and the iron oxide EED particles are considered to contain a certain amount of metallic iron particles as indicted in FIG. 9.

The magnetization ($M_S$) of metallic nanoparticles, e.g. Fe, is larger compared to their metal oxides. However, metallic particles without a barrier coating are not air stable and are therefore easily oxidized, resulting in the change or loss of their magnetization. This is the reason for the decrease in ($M_S$) and increase in (${_J}H_c$) after microwave heating of the iron oxide EED particles.

The mass related content of $Fe^{2+}$ in the iron oxide EED particles was determined by cerimetric titration and measured at 53.83±1.23 wt. %. This value is greater than the theoretical $Fe^{2+}$ portion in magnetite, which is 24.12 wt. %. Also, this result confirms that other iron phases are present in the particles. During the analysis procedure, the $Fe^{2+}$ portion was increased due to the dissolution of the EED particles in an acid solution. In an acid medium and under $N_2$ flow, Fe is oxidized to $Fe^{2+}$, while $H^+$ is reduced to $H_2$. Assuming the fraction of FeO is zero, we can determinate that approximately 30 wt. % of the iron oxide EED particles is Fe.

The $Fe^{2+}$ content of the iron oxide EED particles after microwave heating was only 43.51±1.11 wt. %. This portion is less than the value of the EED particles before microwave heating. This indicates that around 10 wt. % of the $Fe^{2+}$ is generated by the oxidation of Fe during the microwave heating. That is in accordance with the X-ray results and the changes of the hysteresis curves.

The results from the measurement of the magnetic behavior, the measured $Fe^{2+}$ content, the phase analysis and the TEM analysis prove that the iron oxide EED particles absorb microwaves.

Example 6

Heating Behavior of Iron Oxide EED Particles

Figure 12A:
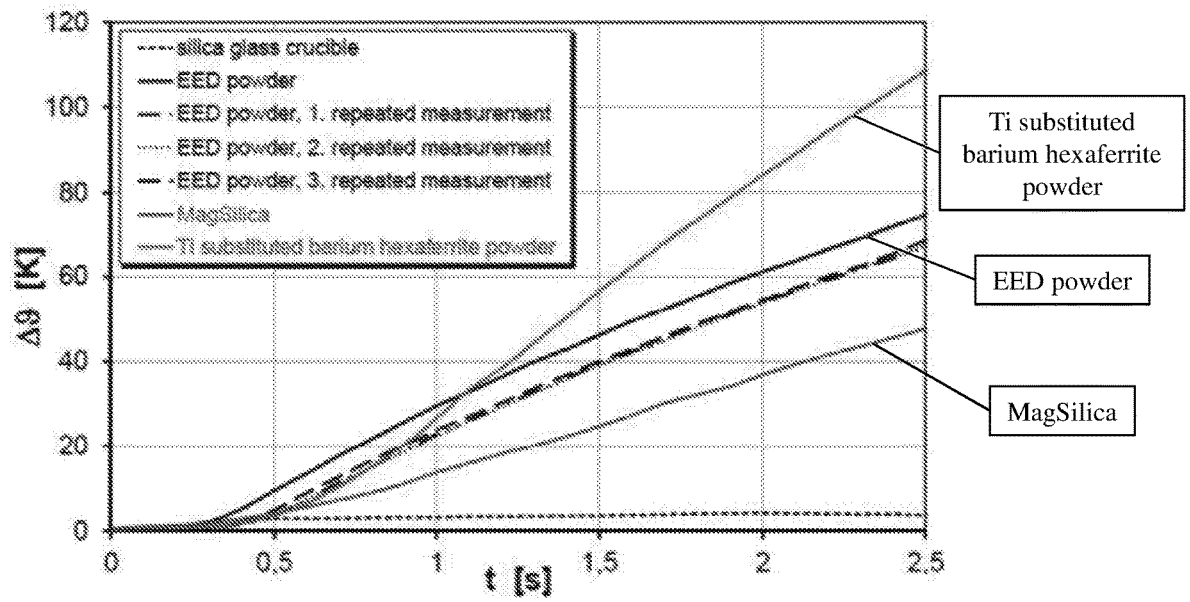
FIG. 12A is a plurality of graphs presenting the heating curve ($\Delta\vartheta$, [K]) over time (t [s]) of iron oxide EED particles (EED powder), Ti substituted barium hexaferrite powder synthesized by a glass crystallization technique (comparative example), and Magsilica® (Evonik) (comparative example) heated in a microwave oven at 2.45 GHz in accordance with aspects of the present disclosure.
Figure 12B:
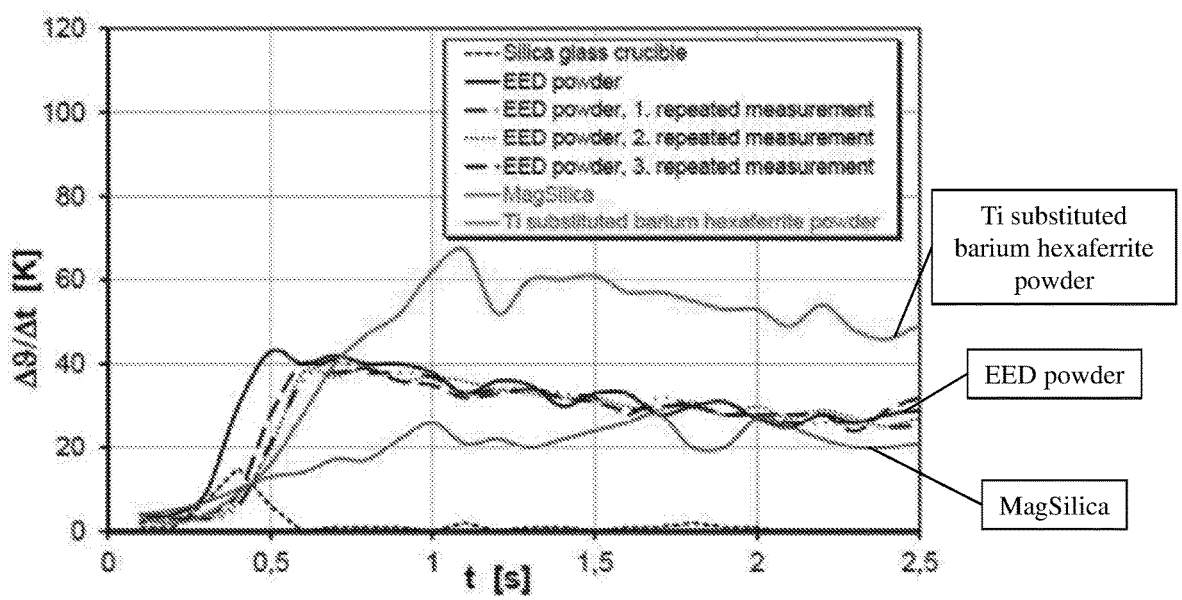
FIG. 12B is a plurality of graphs presenting heating rate ($\Delta\vartheta/\Delta t$, [K]) over time (t [s]) of iron oxide EED particles (EED powder), Ti substituted barium hexaferrite powder synthesized by a glass crystallization technique (comparative example), and Magsilica® (Evonik) (comparative example) in accordance with aspects of the present disclosure.

The heating behavior of iron oxide EED particles was analyzed (FIGS. 12A and 12B). The diagrams presented in FIGS. 12A and 12B show the heating behavior of the synthesized iron oxide EED particles (EED powder) in comparison to Ti substituted barium hexaferrite powder and commercially available iron oxide powder Magsilica® (Evonik Industries AG Essen/Germany). The heat behavior was measured in a microwave field at 2.45 GHz by means of heating curves ($\Delta\vartheta(t)$) and corresponding heating rates ($\Delta\vartheta/\Delta t(t)$). The measurement of the heating behavior for the iron oxide EED particles (EED powder) was repeated three times ($1^{st}$ repeated measurement, "EED powder, 1. repeated measurement;" $2^{nd}$ repeated measurement, "EED powder, 2. repeated measurement;" and $3^{rd}$ repeated measurement "EED powder, 3. repeated measurement").

The heating curve ($\Delta\vartheta(t)$) of the iron oxide EED particles changed after the first microwave treatment but afterward it is nearly constant. The reason for this is the slight change of the metallic phase Fe by oxidation, which is confirmed by the measurements of the magnetic values (FIGS. 10 and 11) and cerimetric titration. Iron oxide EED particles were compared to Ti substituted barium hexaferrite powder and iron oxide powder Magsilica® due to their simplicity to fabricate and low cost. The time dependent heating ($\Delta\vartheta(t)$) and heating rates ($\Delta\vartheta/\Delta t(t)$) of the iron oxide EED particles were similar to the values of Ti substituted barium hexaferrite powder, but larger than the heating and the heating rates of the commercially MagSilica® powder. The calculated heating rate ($\Delta\vartheta/\Delta t$) at the beginning of the heating for the iron oxide EED particles is about 40 K/s. This is ⅔ of the heating rate of the Ti substituted barium hexaferrite powder.

Example 7

Fabrication of Crystalline Alumina EED Particles

Figure 13:
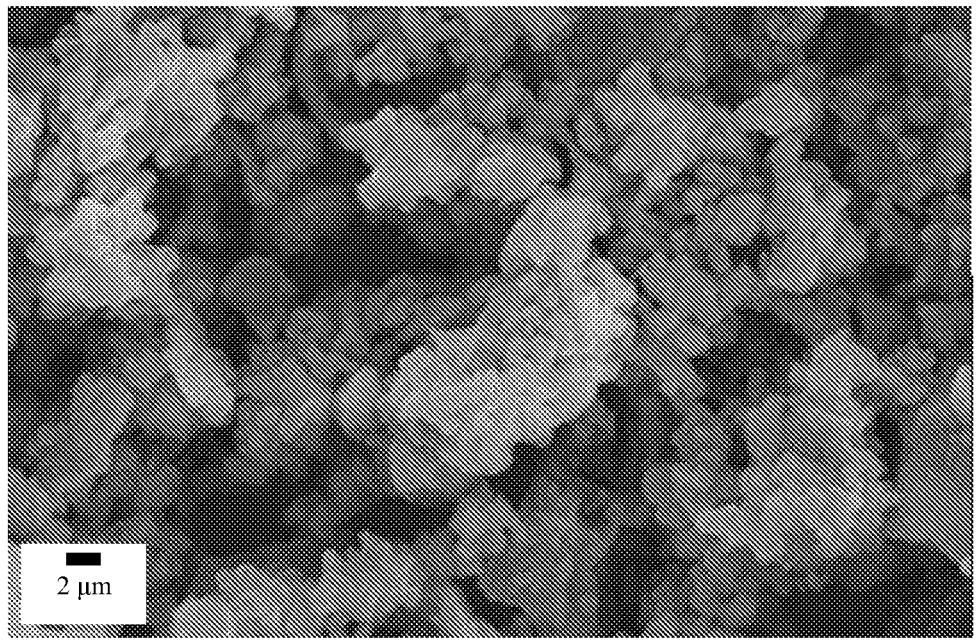
FIG. 13 is an image depicting crystalline alumina EED particles in accordance with aspects of the present disclosure (scale bar, 2 µm)

Crystalline Alumina particles were fabricated using electroerosion dispersion (EED) (FIG. 13). Specifically, aluminum bulk materials were dispersed by EED in a liquid, wherein the liquid was constantly pumped through the plasma reactor and the plasma reactor comprised two electrodes and plasma. The resulting EED particles had a diameter of about 1 μm.

Example 8

Fabrication of Amorphous Alumina EED Particles

Figure 14:
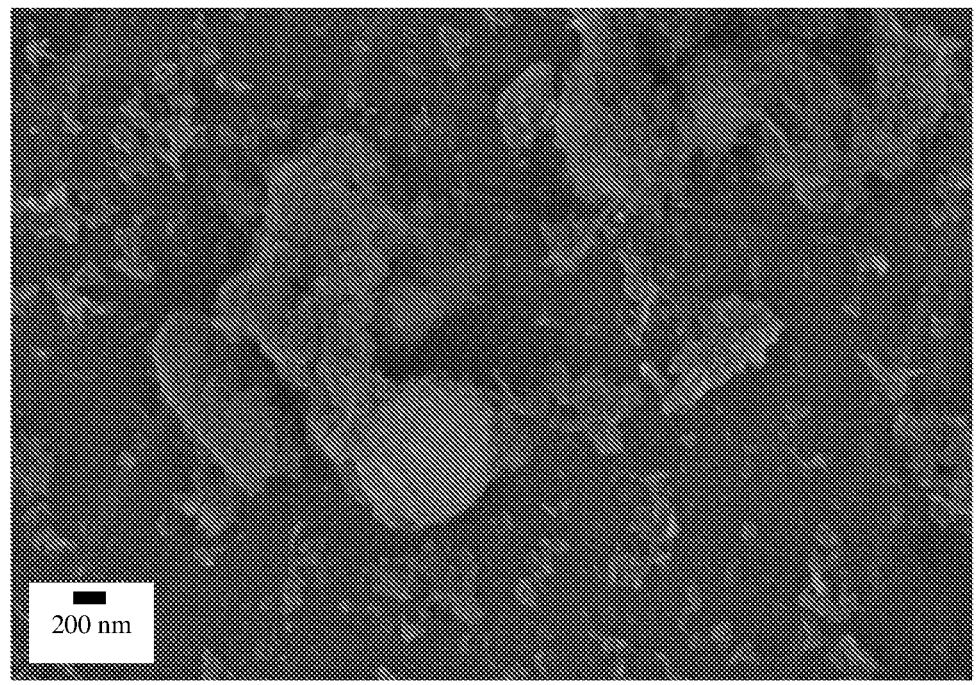
FIG. 14 is an image depicting amorphous alumina EED particles in accordance with aspects of the present disclosure (scale bar, 200 nm)

Amorphous Alumina ($Al_2O_3$) particles were fabricated using electroerosion dispersion (EED) (FIG. 14). Specifically, aluminum bulk materials were dispersed by EED in a liquid, wherein the liquid was constantly pumped through the plasma reactor and the plasma reactor comprised two electrodes and plasma. The resulting EED particles had a specific surface (S) of 137 $m^2/g$ and a porosity (Rpor) of 24 Å.

Example 9

Treatment of Liquid Sample Using Iron Oxide EED Particles

A liquid sample was treated with iron oxide EED particles (FIG. 15). The ions of metals and heavy metals were extracted from a galvanic drain aqueous sample using iron oxide EED particles as coagulant. Specifically, a dry powder of iron oxide EED particles, which consumes 6-7 grams of dry powder per gram of impurities, was added to the liquid sample and mixed for 8-10 minutes. After the coagulation has ended, the resulting slurry was passed through a self-cleaning filter (e.g. AMIAD) with a mesh size of 10 μm. The quality of the galvanic drain aqueous sample after treatment corresponded to the requirements of the Clean Water Act.

Example 10

Treatment of Liquid Sample Using Aluminum Oxide EED Particles

A liquid sample was treated with aluminum oxide EED particles (FIG. 16). The ions of metals and heavy metals were extracted from wastewater samples using aluminum oxide EED particles as coagulant.

Example 11

Fabrication of Cobalt, Nickel, and Hard Alloy EED Particles

Figure 17A:
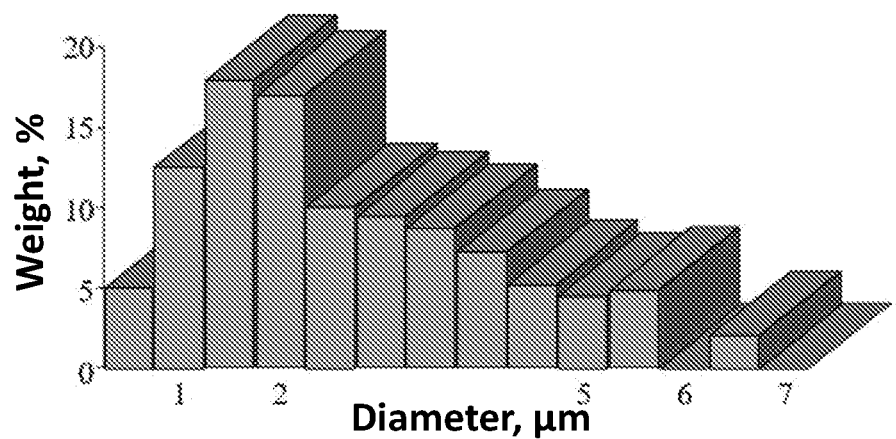
FIG. 17A is an histogram of the mass distribution of particles of the Co EED particles in accordance with aspects of the present disclosure.
Figure 17B:
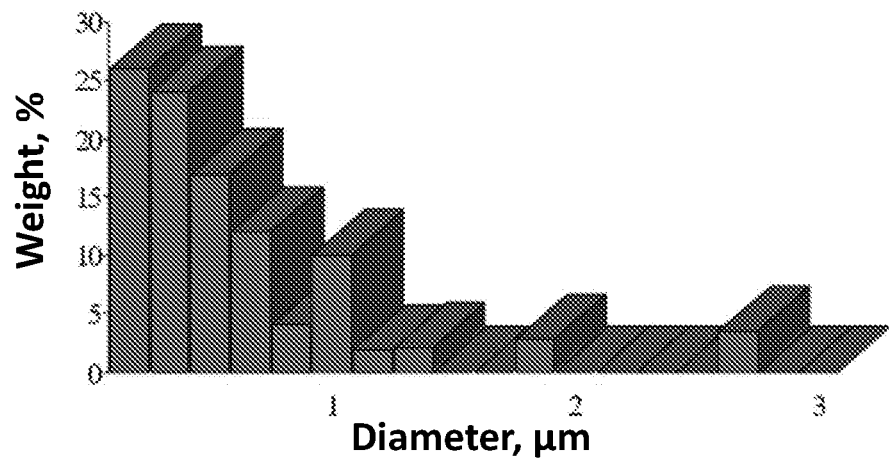
FIG. 17B is an histogram of the mass distribution of particles of the hard allow EED powder in accordance with aspects of the present disclosure.
Figure 17C:
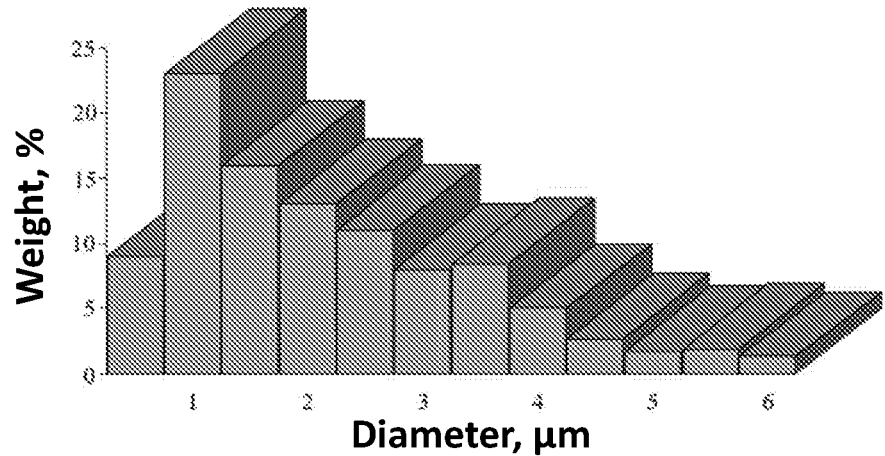
FIG. 17C is an histogram of the mass distribution of particles of the Ni EED powder in accordance with aspects of the present disclosure.

Cobalt, nickel, and hard alloy particles were fabricated using the EED method (FIGS. 17A-C). The histograms presented in FIGS. 17A-C show the mass distributions of cobalt, nickel, and hard alloy EED particles.

Example 12

Recycling of Tungsten Carbide Alloy by EED

Figure 18A:
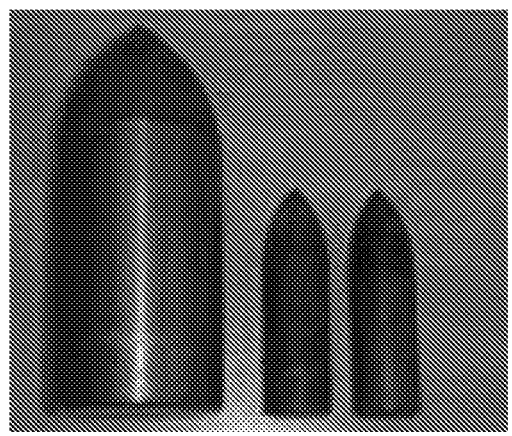
FIG. 18A is a picture of military products comprising tungsten carbide alloy in accordance with aspects of the present disclosure.
Figure 18B:
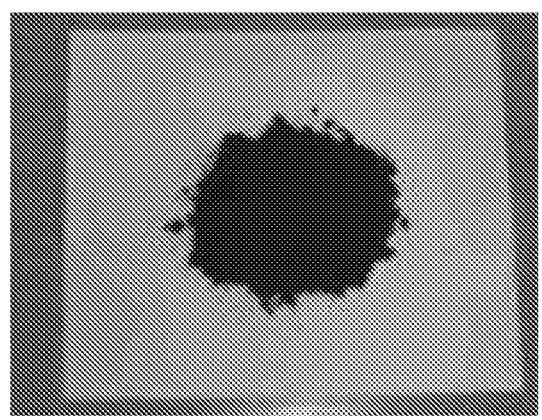
FIG. 18B is a picture of EED powder fabricated from the military products disclosed in FIG. 18A in accordance with aspects of the present disclosure.
Figure 18C:
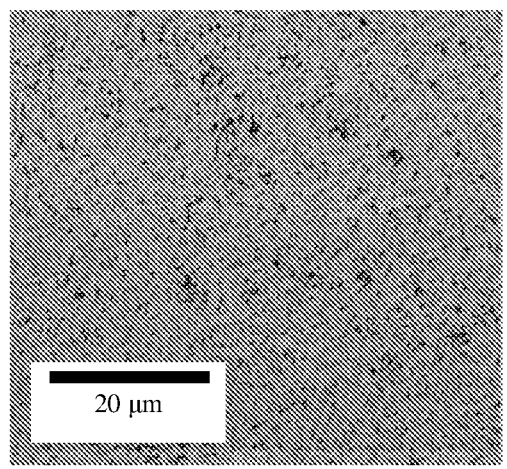
FIG. 18C is a TEM image of the powder disclosed in FIG. 18B in accordance with aspects of the present disclosure (scale bar, 20 µm).

Tungsten carbide alloy was recycled by EED (FIGS. 18A-C). The alloy was obtained from military products and transformed into particles using EED. FIG. 18B shows the resulting EED powder comprising tungsten particles and FIG. 18C shows a TEM image of the resulting EED powder.

What is claimed:

1. A method of fabricating metal particles comprising:
adding a plurality of metallic elements into a plasma reactor comprising two electrodes and containing a circulating fluid;
evaporating said metallic elements to form metal vapor using plasma generated by at least one electric discharge pulse between said electrodes; and
condensing said metal vapor to form metal particles;
transporting said metallic particles to a sedimentation tank coupled to said plasma reactor;
allowing said metallic particles to settle in said sedimentation tank;
removing said sediment from said sedimentation tank;
sublimating said sediment;
drying said sediment; and
milling said sediment.

2. The method of fabricating metal particles of claim 1, wherein the metallic particles are carried to said sedimentation tank by said circulating fluid.

3. The method of fabricating metal particles of claim 1, wherein the metallic elements are selected from the group consisting of iron containing elements, aluminum containing elements, titanium containing elements, and tungsten containing elements, or any combinations thereof.

4. The method of fabricating metal particles of claim 1, wherein said circulating fluid comprises water, hydrogen peroxide, or a combination thereof.

5. The method of fabricating metal particles of claim 1, wherein the metal particles have a size between 2 nm and 60 µm.

6. The method of fabricating metal particles of claim 1, wherein the metal particles have a size between 2 nm and 30 µm.

7. The method of fabricating metal particles of claim 1, wherein the metal particles have a size between 2 nm and µm.

8. The method of fabricating metal particles of claim 1, wherein the metal particles comprise metal oxide particles.

9. The method of fabricating metal particles of claim 1, wherein the metal particles comprise iron oxide particles.

10. The method of fabricating metal particles of claim 9, wherein said iron oxide particles absorb microwaves.

11. The method of fabricating metal particles of claim 1, wherein the metal particles comprise alumina particles.

* * * * *